(12) United States Patent
Schellstede

(10) Patent No.: US 11,344,828 B2
(45) Date of Patent: May 31, 2022

(54) METHOD AND APPARATUS FOR REMEDIATING DRILLING MUD AND TREATING DRILLING CUTTINGS

(71) Applicant: SCHELLSTEDE-LEE INTERESTS, LLC, Las Vegas, NV (US)

(72) Inventor: Herman Schellstede, New Iberia, LA (US)

(73) Assignee: SCHELLSTEDE-LEE INTERESTS, LLC, Las Vegas, NV (US)

( * ) Notice: Subject to any disclaimer, the term of this patent is extended or adjusted under 35 U.S.C. 154(b) by 714 days.

(21) Appl. No.: 16/042,745

(22) Filed: Jul. 23, 2018

(65) Prior Publication Data

US 2018/0326330 A1 Nov. 15, 2018

Related U.S. Application Data

(63) Continuation-in-part of application No. PCT/US2018/019560, filed on Feb. 23, 2018.
(Continued)

(51) Int. Cl.
*B01D 33/48* (2006.01)
*B01D 33/048* (2006.01)
(Continued)

(52) U.S. Cl.
CPC ........... *B01D 33/048* (2013.01); *B01D 33/04* (2013.01); *B01D 33/056* (2013.01); *B01D 33/48* (2013.01);
(Continued)

(58) Field of Classification Search
CPC ........ B01D 33/04; B01D 33/80; B01D 33/76; B01D 21/066; B01D 33/38; B01D 35/06; B01D 33/54; F26B 3/00
See application file for complete search history.

(56) References Cited

U.S. PATENT DOCUMENTS 4,283,285 A 8/1981 Paschen
4,639,258 A 1/1987 Schellstede
(Continued)

FOREIGN PATENT DOCUMENTS

CN 106978637 A * 7/2017
JP 4651045 B 8/2007
JP 4364889 B2 1/2008

*Primary Examiner* — Walter D. Griffin
*Assistant Examiner* — Cameron J Allen
(74) *Attorney, Agent, or Firm* — Roy Kiesel Ford Doody & North, APLC

(57) ABSTRACT

A drilling mud remediation and drilling cutting treatment device and method. There are three main components: a vacuum liquid solid separator; a pelletizer; and an induction furnace. The liquid solid separator has a seamless filter belt configured to carry a mixture of liquids and solids over a vacuum. A slurry comprised of drilling mud and cuttings is deposited on the filter belt. An applicator ensures that the slurry is deposited evenly across the entire filter belt at a uniform thickness. The vacuum removes most of the liquids for further treatment and reuse. The solids are transferred to a pelletizer which compacts them into relatively uniform pellets while removing much residual liquid. The pelletized cuttings are then passed through an induction furnace, which removes any residual liquids, renderings the cuttings safe for disposal.

58 Claims, 29 Drawing Sheets

Related U.S. Application Data

(60) Provisional application No. 62/462,393, filed on Feb. 23, 2017.

(51) Int. Cl.
| | |
|---|---|
| *F26B 3/00* | (2006.01) |
| *E21B 21/06* | (2006.01) |
| *B01D 33/80* | (2006.01) |
| *B01D 33/04* | (2006.01) |
| *B01D 33/76* | (2006.01) |
| *B01D 33/056* | (2006.01) |
| *B01D 33/72* | (2006.01) |
| *B01D 33/62* | (2006.01) |
| *B01D 33/54* | (2006.01) |
| *B01D 35/06* | (2006.01) |

(52) U.S. Cl.
CPC .............. *B01D 33/54* (2013.01); *B01D 33/62* (2013.01); *B01D 33/72* (2013.01); *B01D 33/76* (2013.01); *B01D 33/80* (2013.01); *B01D 35/06* (2013.01); *E21B 21/066* (2013.01); *F26B 3/00* (2013.01)

(56) References Cited

U.S. PATENT DOCUMENTS

| | | | | |
|---|---|---|---|---|
| 4,874,507 A | * | 10/1989 | Whitlock | B01D 21/0009 209/11 |
| 2006/0096119 A1 | * | 5/2006 | Schellstede | E21B 21/066 34/523 |
| 2011/0089122 A1 | * | 4/2011 | Smith | B01D 33/04 210/774 |

* cited by examiner

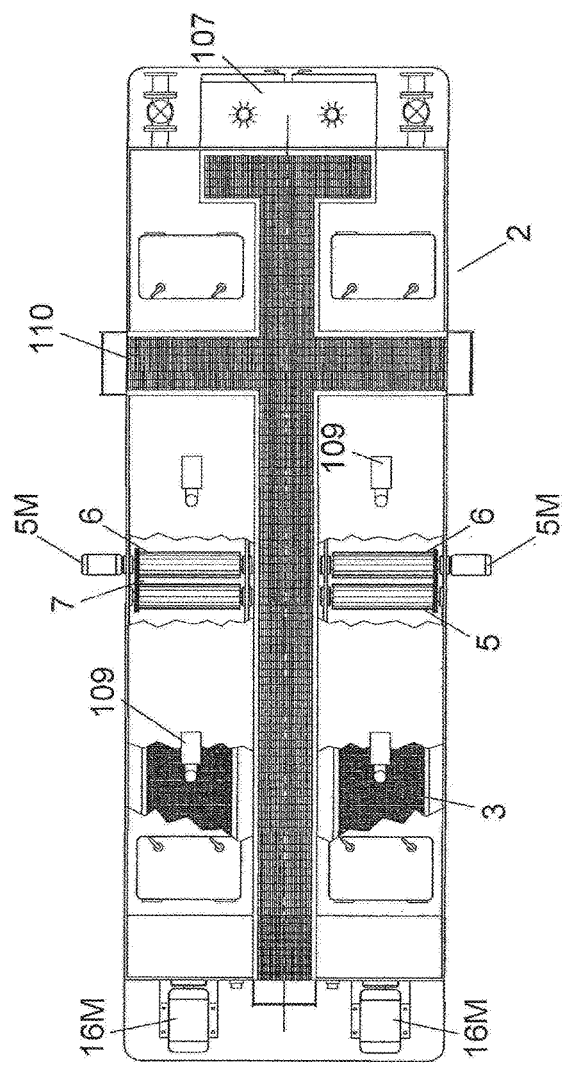
FIG. 1-A

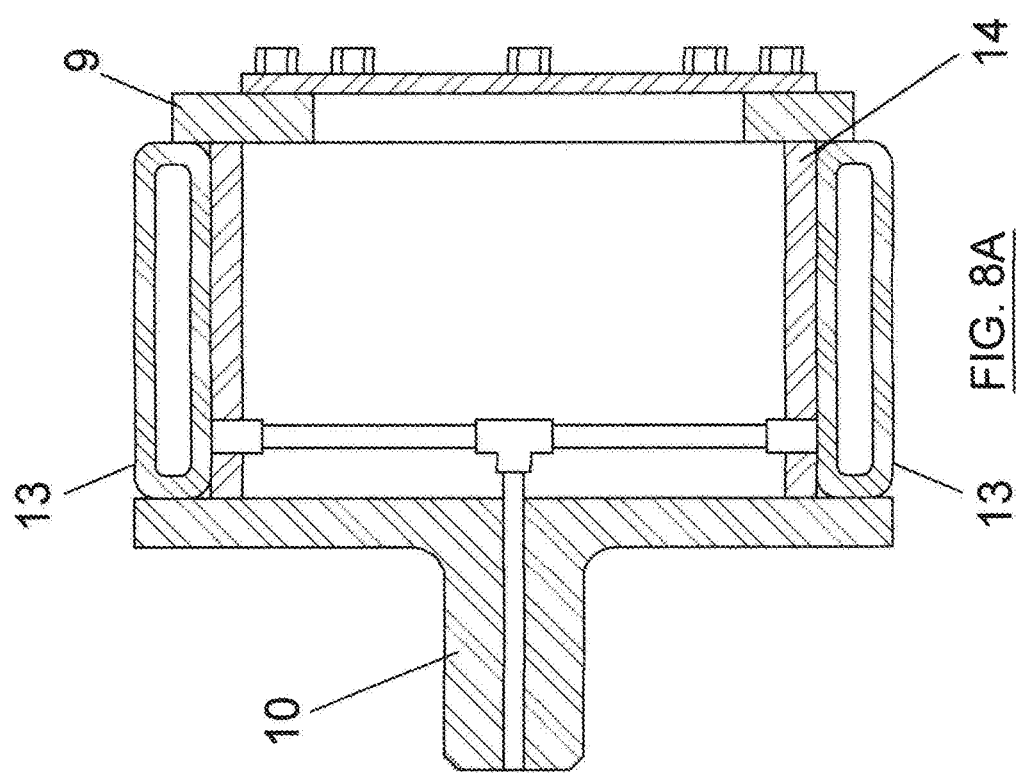

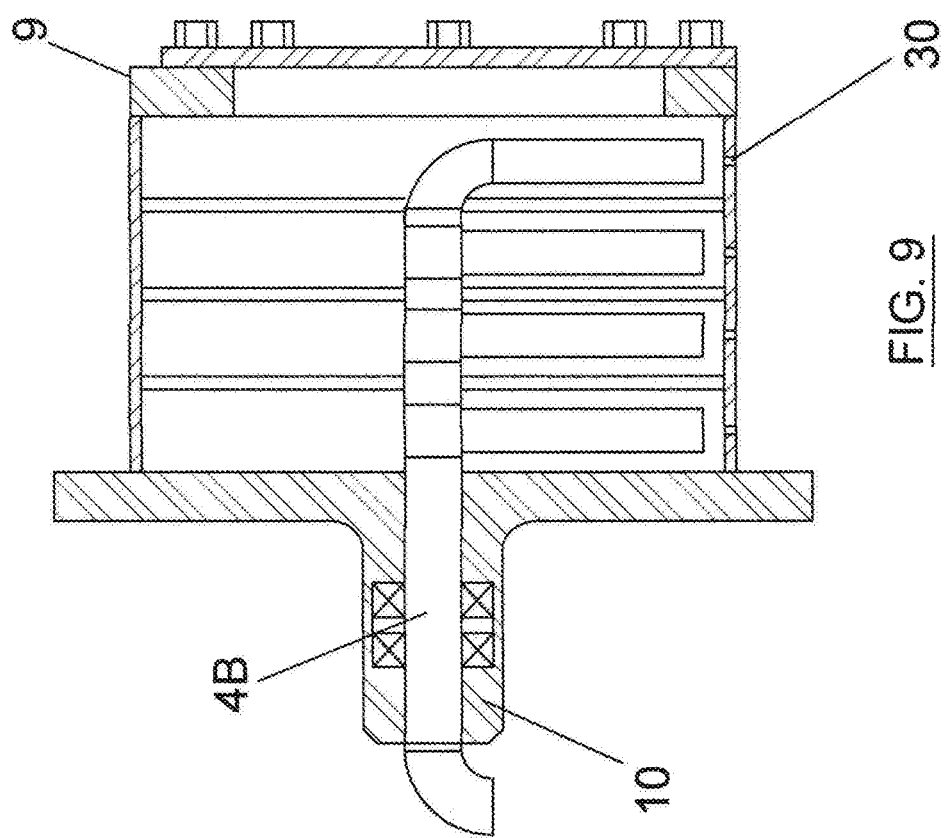

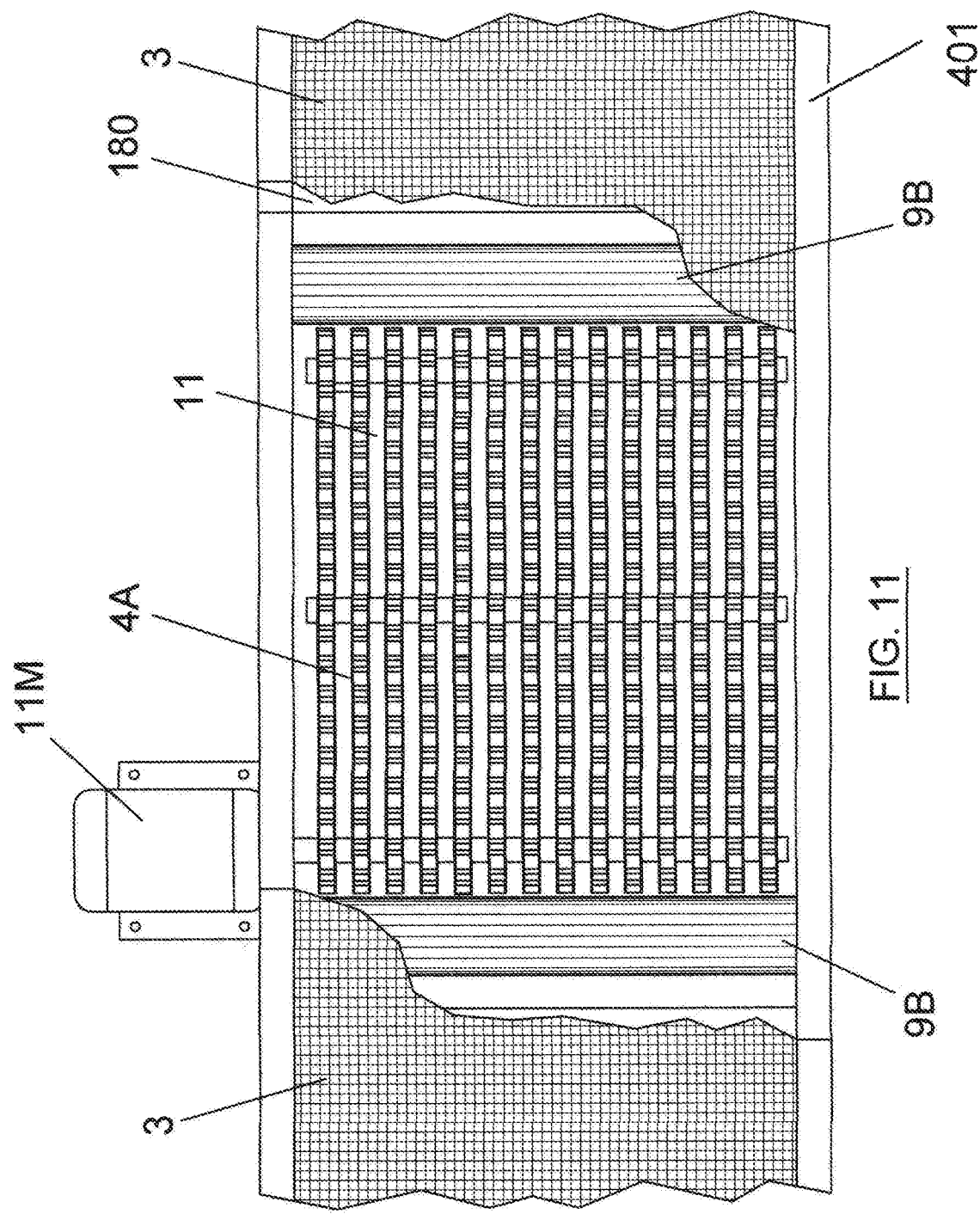

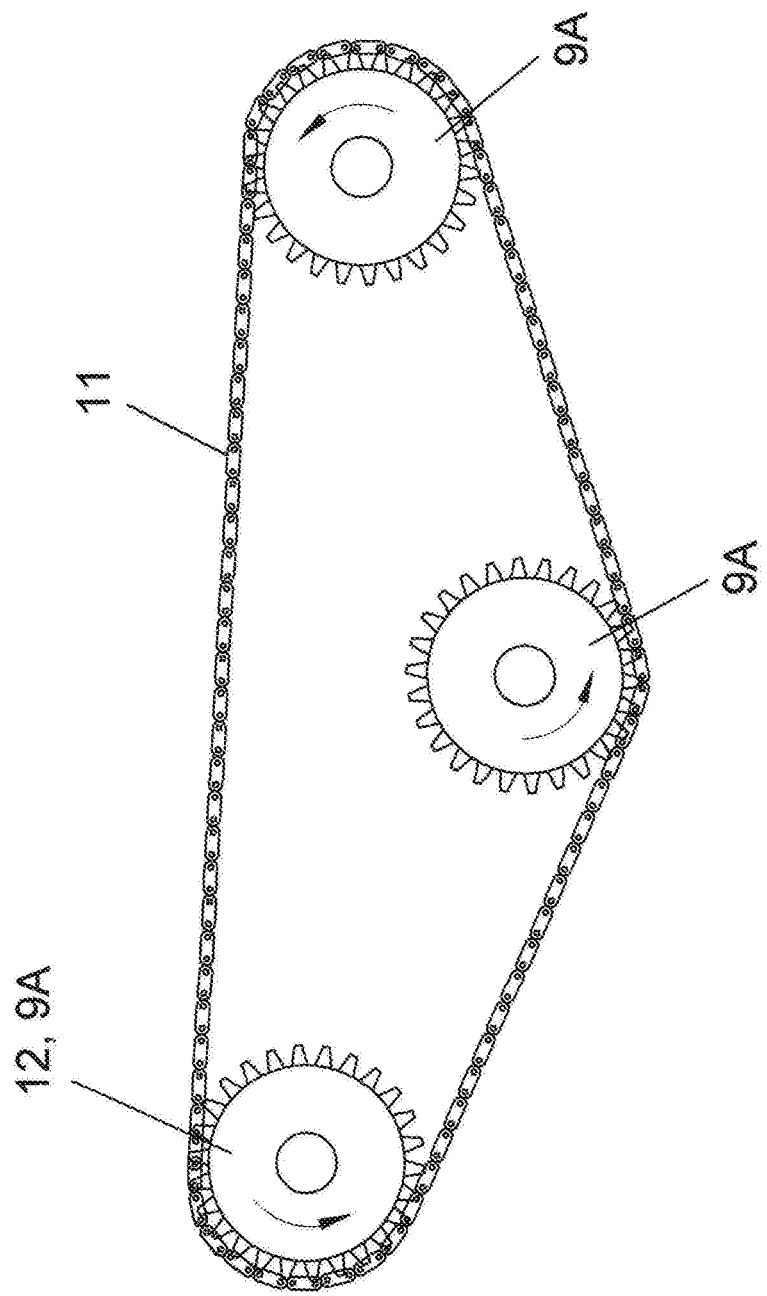

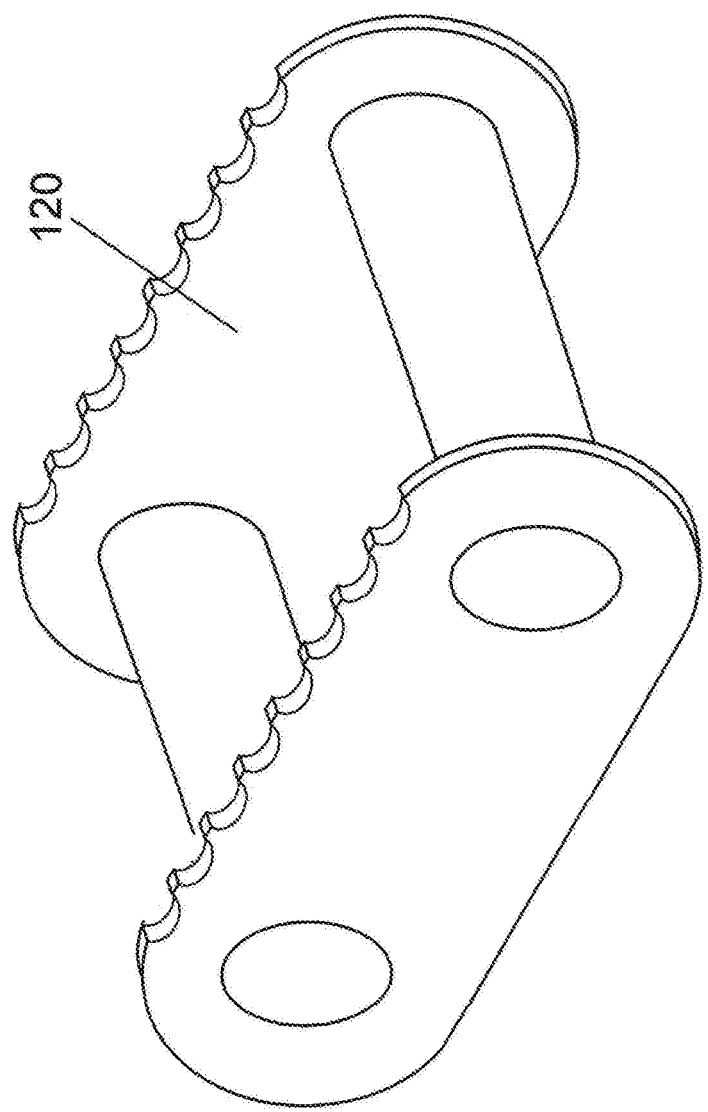
FIG. 11-B

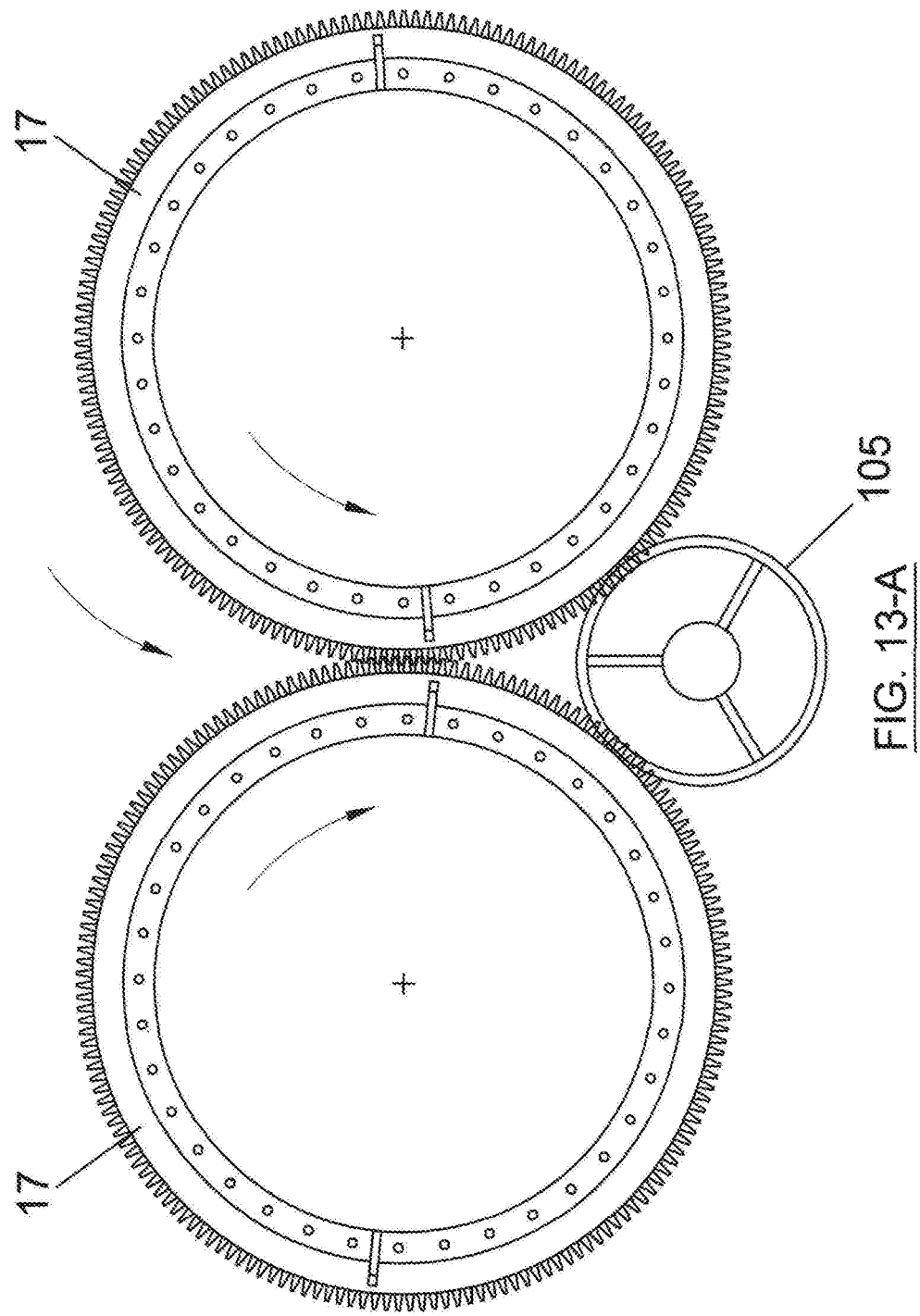

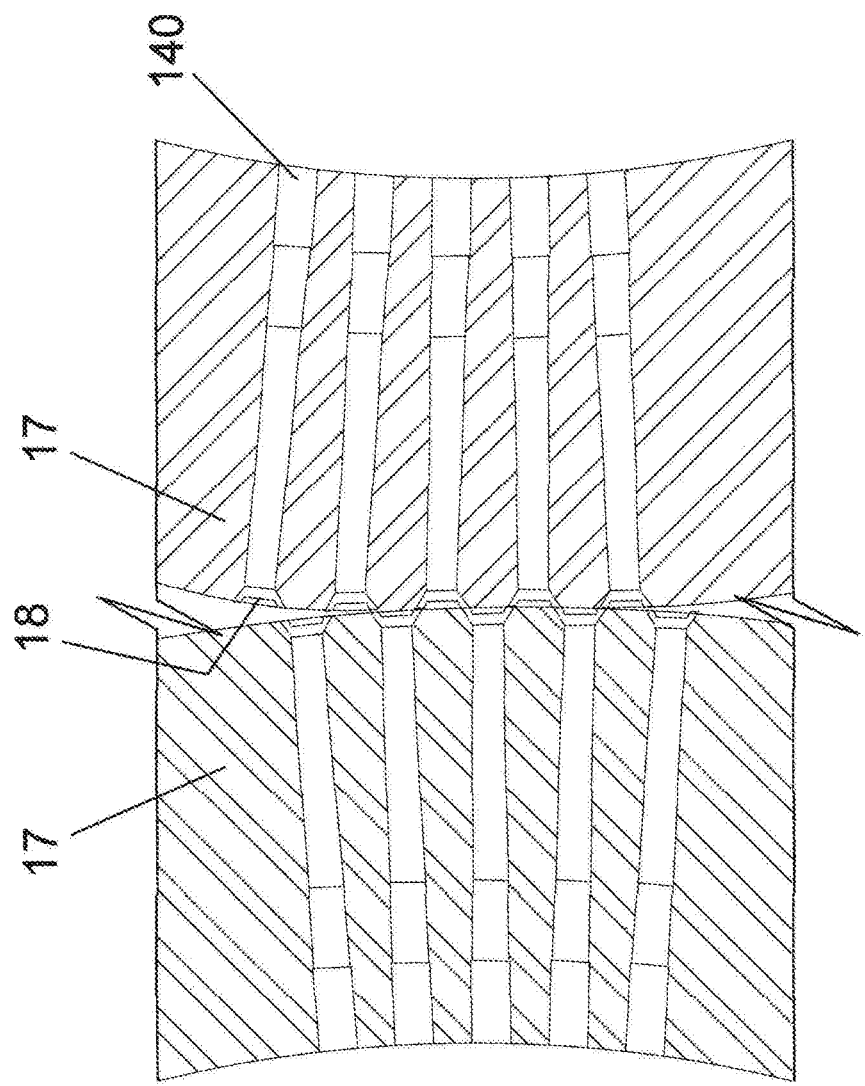
FIG. 13-B

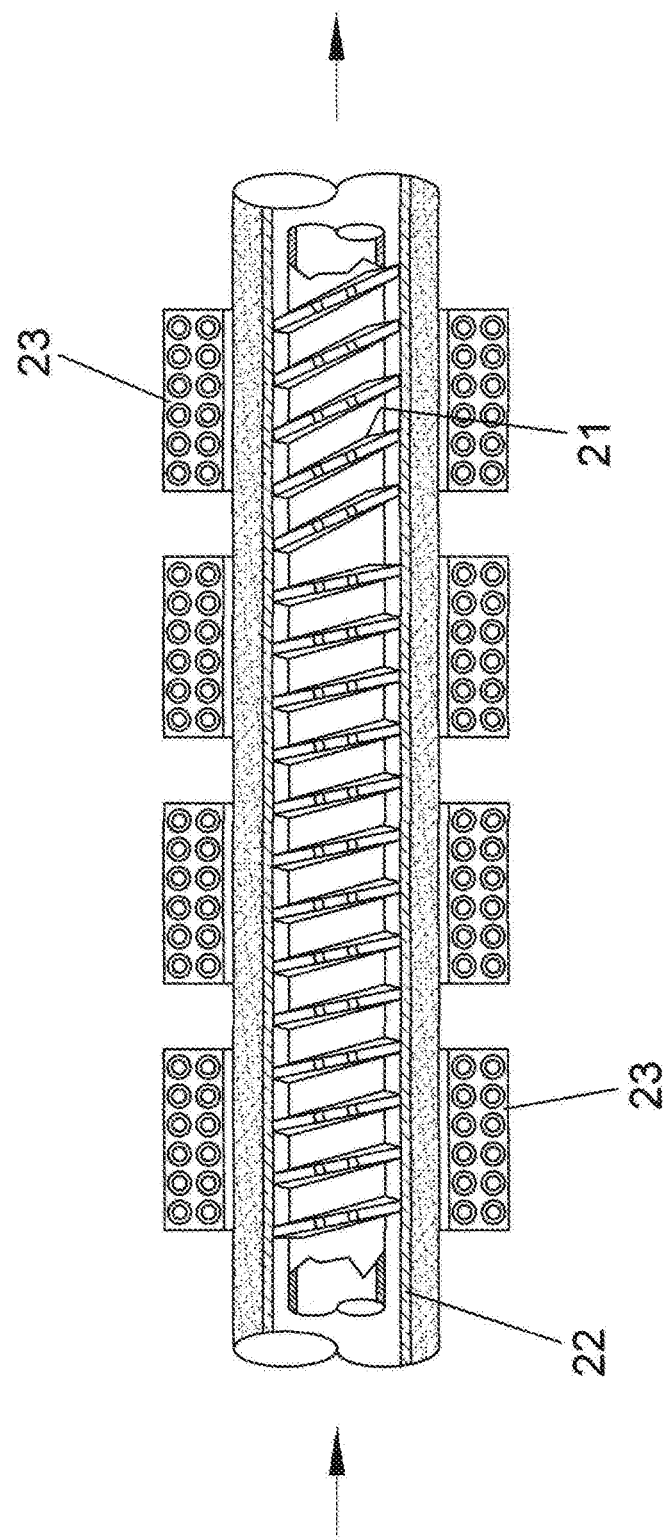
FIG. 15-A

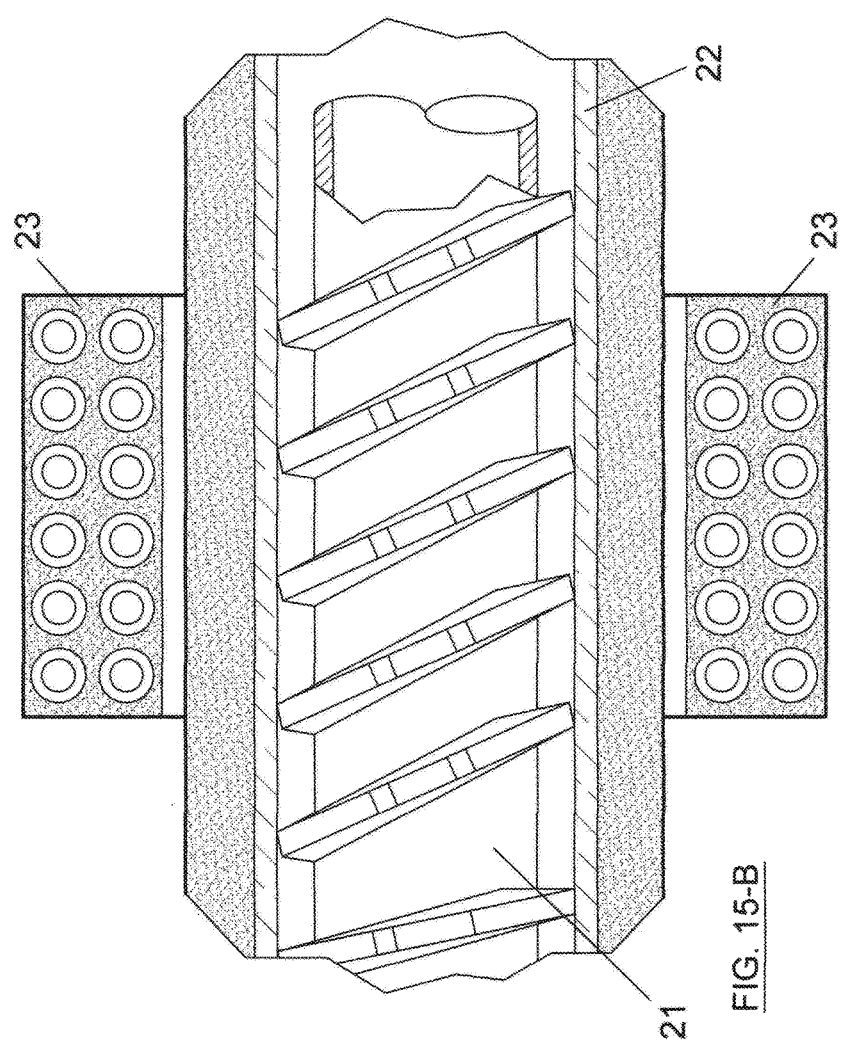
FIG. 15-B

| Depth | Typical Formation Components | Filter Aperture | Belt Features | Other Conditions |
|---|---|---|---|---|
| Surface-1500 Feet | Surface Soil, Sand, Clays | 34-41 Microns (API No. 400) | Woven or Metal Sheet | No elevated temperature |
| 1500-4000 Feet | Sand, Clays, Limestone | 41-49 Microns (API No. 325) | Woven or Metal Sheet | No elevated temperature |
| 4000 - 12,000 Feet | Sand, Clays, Dolomite, Limestone, Sandstone | 74 Microns or Larger if Barite Present | Woven or Metal Sheet | Downhole Temp: 165 - 200°F; Weighting Material Added |
| 12,000 - 14,000 Feet | Dolomite, Limestone, Granite | 74 Microns or Larger if Barite Present | Preferably Metal Sheet | Downhole Temp: 300 - 525°F; Weighting Material Added - up to 16 lbs./gal., Mud usually oil-based. |
| 14,000 - 20,000 Feet | Chert, Dolomite, Consolidated Sands, Hard Rock | 74 Microns or Larger if Barite Present | Preferably Metal Sheet | Downhole Temp: 300-525°F; Weighting Material Added - up to 19 lbs./gal., Mud usually oil-based. |

FIG. 17

METHOD AND APPARATUS FOR REMEDIATING DRILLING MUD AND TREATING DRILLING CUTTINGS

CONTINUATION HISTORY

This application is a continuation-in-part of Patent Cooperation Treaty Application Number US 2018/19560, which claimed benefit of Provisional U.S. Application No. 62/462,393, both of which are hereby incorporated by reference in their entirety.

BACKGROUND OF THE INVENTION

Field of the Invention

The invention relates to drilling mud remediation in general and to the separation and treatment of solids from used drilling mud in particular.

Prior Art

Drilling mud is a multi-purpose fluid. During drilling, it is pumped down through a drill stem to and through the mud motor, to which the drill bit is attached. The force of the drilling fluid being pumped through the mud motor drives the motor and thus the bit. In this respect the drilling mud functions as an hydraulic fluid.

Of course, drilling mud is necessary for rotary drilling as well. The mud will not serve as the driving force for the bit—rotation of the drill string will accomplish that. However, the following functions of drilling mud are equally applicable to top drive rotary drilling and downhole mud motors.

As the bit turns, it will create cuttings—small pieces of the geologic formation through which the bit is drilling. These may be pieces of rock, shale, clay, sand, granite, etc.—essentially any substrata of the earth. These cuttings must be removed from the well-bore. As the drilling mud is pumped back to the surface, the mud entrains the cuttings and carries them with it. Thus, the mud serves as a liquid conveyor for the cuttings.

The drill bit is necessarily larger in diameter than the mud motor and the drill stem. This allows the drill bit to cut a well-bore that is larger in diameter than the mud motor or the drill stem. Thus, there is an annulus between the drill stem and the walls of the well-bore. The annulus forms a passage for the drilling mud and the material entrained in it to return to the surface. The drilling mud is forced back to the surface of the well, via the annulus, by the pressure of new mud exiting the mud motor or drill stem.

The well-bore must remain open. If it collapses upon the drill stem, the drill stem may become stuck. The drilling mud serves to hold up the walls of the well-bore. The drilling mud also needs to seal the walls of the well-bore. Other se, the drilling mud may be lost to the formation via pores in the walls of the well-bore. The drilling mud is expensive, and its loss is to be minimized.

Once the drilling mud reaches the surface, the cuttings must be separated from the drilling mud. Rock-filled drilling mud cannot be pumped through the mud motor or other production line equipment (pumps, pipe, valves, jets, etc.) without doing serious damage to the equipment. Even when the cutting content of the mud is not so great as to damage the equipment, high solids content in the drilling mud will slow the mud motor and ultimately, the rate of penetration. Removal of the cuttings is necessary for the drilling mud to be reused.

Smaller cuttings are more difficult to remove than larger cuttings. Moreover, a high percentage of fine cuttings in the mud has a particularly negative effect on the rate of penetration. Because of their smaller surface area, smaller cuttings can increase the density of the mud much more readily than larger cuttings. This can lead to a host of drilling problems such as sticking of the drill stem, degradation of the well bore, and back pressure on the mud motor. Thus, it is desirable that the cuttings be removed as quickly as possible and with a minimum of handling of the drilling mud. Each time the cuttings are pumped, shearing will occur, which will introduce smaller pieces of the cuttings to the mud. Minimizing—or eliminating—pumping prior to cuttings removal is desirable in order to minimize shearing and facilitate cuttings removal.

Once the cuttings are removed, they pose a disposal problem. The drilling mud frequently contains hydrocarbons. It may be an oil based mud, in which case the mud will be predominantly hydrocarbon. However, even water based muds will frequently contain hydrocarbons when they return to the surface. Petroleum wells are intentionally drilled into petroleum bearing geologic formations. That is, literally, their point. Petroleum from the formation will enter the drilling mud. These formation oils and/or oils from the mud will coat the cuttings. Additionally, many of the cuttings are porous. Petroleum will enter the pores of the cuttings, filling and coating them. In some formations, such as shale formations, petroleum is often in the cuttings from the outset. When the cuttings are removed from the drilling mud, the petroleum and other oils must be removed from the cuttings before the cuttings can be disposed.

When the cuttings are produced in an on-shore well, they are typically shipped to an off-site location for treatment. Shipping oil coated rocks via truck is no small expense, nor is off-site treatment. When cuttings are created offshore, the cuttings must either be shipped to shore, at an even greater expense than trucking, and then treated and disposed or they may treated on the rig. If the cuttings can be treated on the rig, they may be dumped in the sea, at considerable savings. Accordingly, a device and system for removing cuttings from used drilling mud and for removing drilling mud from separated cuttings meeting the following objectives is desired.

OBJECTS OF THE INVENTION

It is an object of the invention to remove cuttings from drilling fluid.

It is another object of the invention to remove cuttings from drilling fluid with as little handling of the cuttings prior to removal as possible.

It is yet another object of the invention to remove cuttings from the drilling with as little shearing of the cuttings prior to removal as possible.

It is still another object of the invention to minimize the Toss of drilling fluid during separation.

It is yet another object of the invention to facilitate interchange of filter belts in the liquid solid separation device.

It is still another object of the invention to remove substantially all oils and liquids from the cuttings.

It is yet another object of the invention to render the cuttings suitable for disposal in open water.

It is still another object of the invention to render the cuttings suitable for disposal in landfills or for use in aggregate.

It is yet another object of the invention to facilitate movement of the cuttings through an induction furnace.

It is still another object of the invention to pelletize the cuttings.

It is yet another object of the invention to remove solids from drilling mud, pelletize the solids, and remove substantially all liquids from the solids in a single processing unit.

It is still another object of the invention to minimize the equipment footprint required to remove solids from drilling mud, pelletize the solids, and remove substantially all liquids from the solids.

It is yet another object of the invention to minimize the weight of the equipment required to remove solids from drilling mud, pelletize the solids, and remove substantially all liquids from the solids.

It is still another object of the invention to minimize the energy required to remove solids from drilling mud, pelletize the solids, and remove substantially all liquids from the solids.

SUMMARY OF THE INVENTION

A drilling mud remediation and drilling cuttings treatment device and method are disclosed. There are three main components: a vacuum liquid solid separator; a pelletizer; and an induction furnace. The liquid solid separator has a seamless filter belt configured to carry a mixture of liquids and solids over a vacuum. A slurry comprised of drilling mud and cuttings is deposited on the filter belt. An applicator ensures that the slurry is deposited evenly across the entire filter belt at a uniform thickness. The vacuum removes most of the liquids for further treatment and reuse. The solids are then transferred to a pelletizer which compacts them into relatively uniform pellets while removing much residual liquid. The pelletized cuttings are finally passed through an induction furnace, which vaporizes the residual liquid, rendering the solids safe for disposal both onshore and off.

BRIEF DESCRIPTION OF THE FIGURES

FIG. 1A is a top, partial cut-away view illustrating the relationship of a preferred embodiment of the applicator in a separator having two filter lines.

FIG. 8A is a side cut-away view of a preferred embodiment of a roller with a bladder shown in the inflated position.

FIG. 9 is a side, cut-away perspective view illustrating a preferred embodiment of a roller configured to apply a vacuum to the filter belt.

FIG. 11 is a top view of a preferred embodiment of a vacuum table.

FIG. 11A is a side view of a preferred embodiment of a drive belt shown in place on a drive wheel and rollers.

FIG. 11B is a perspective view of a preferred embodiment of a drive belt link.

FIG. 13A is an end view of a preferred embodiment of mated pair of pelletizer wheels and a star valve.

FIG. 13B is a cut-away view showing the mating connection of a pair of pelletizer wheels.

FIG. 15 is a side, cut-away view of a preferred embodiment of an induction furnace.

FIG. 15B is a side, cut-away view of a section of a preferred embodiment of an induction furnace.

FIG. 17 is a chart disclosing a filter schedule tor an example well bore.

DISCLOSURE OF THE BEST MODE

Figure 1:
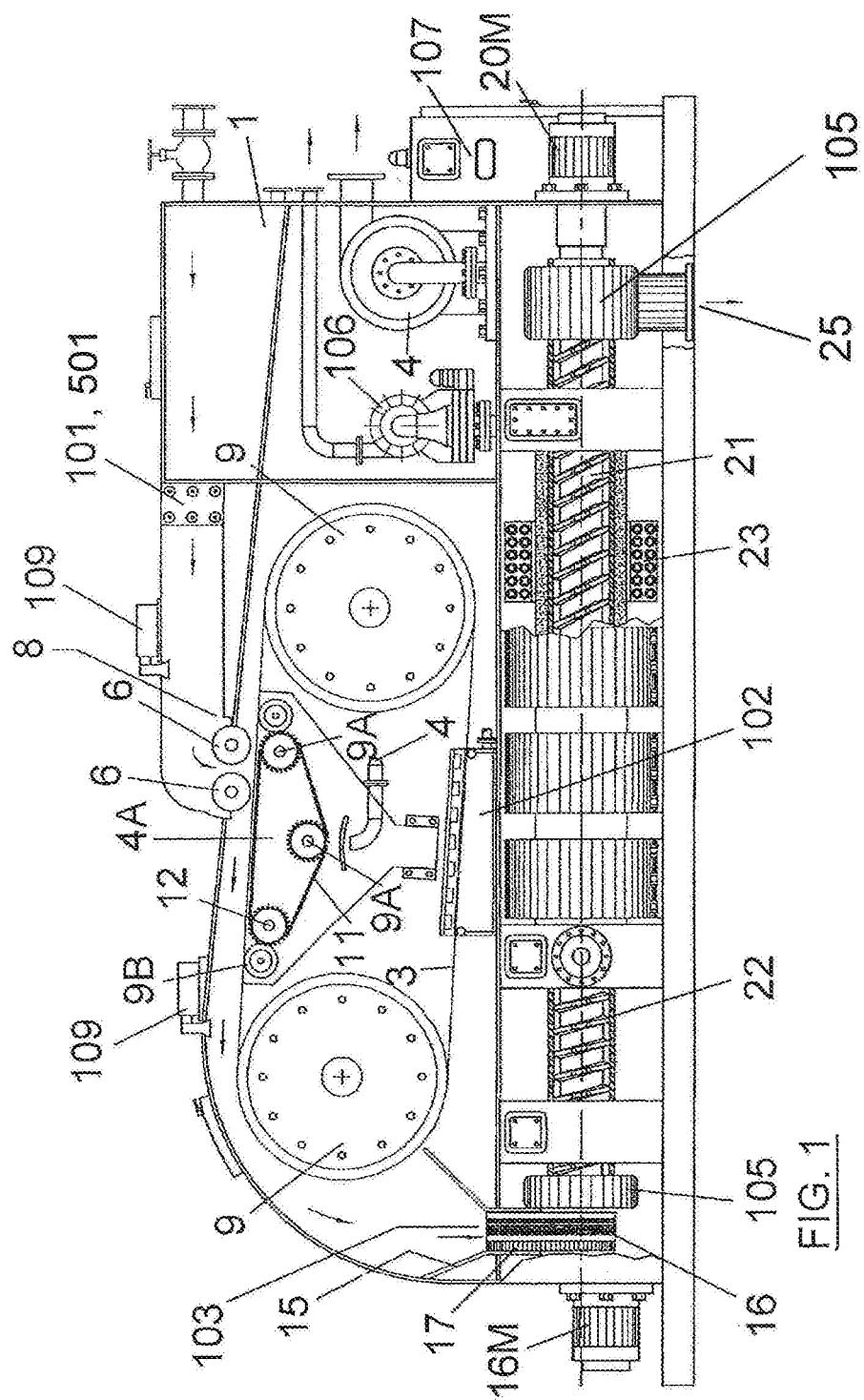
FIG. 1 is side cut-away view of a preferred embodiment of the liquid solid separator, pelletizer, and induction furnace.
Figure 2:
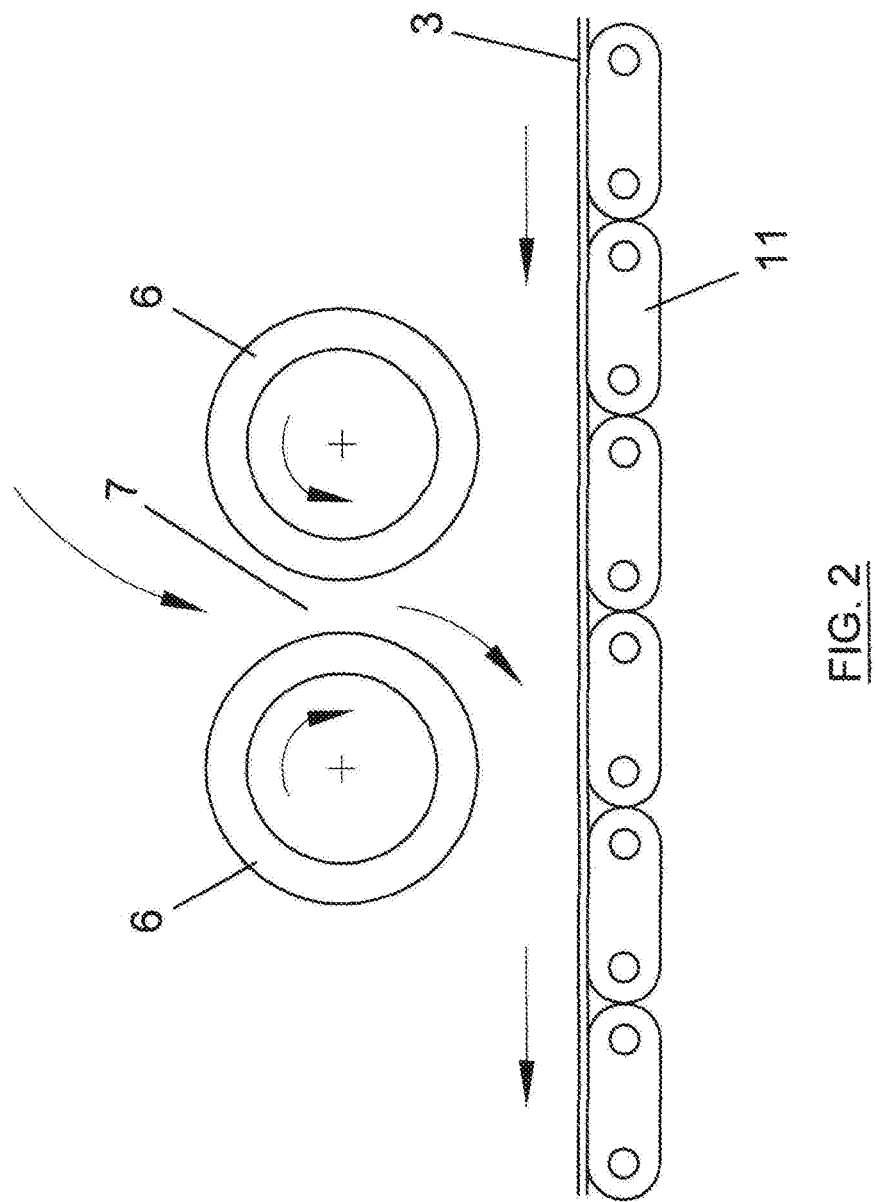
FIG. 2 is side view of a preferred embodiment of an applicator shown in proximity to a portion of the fitter belt.
Figure 3:
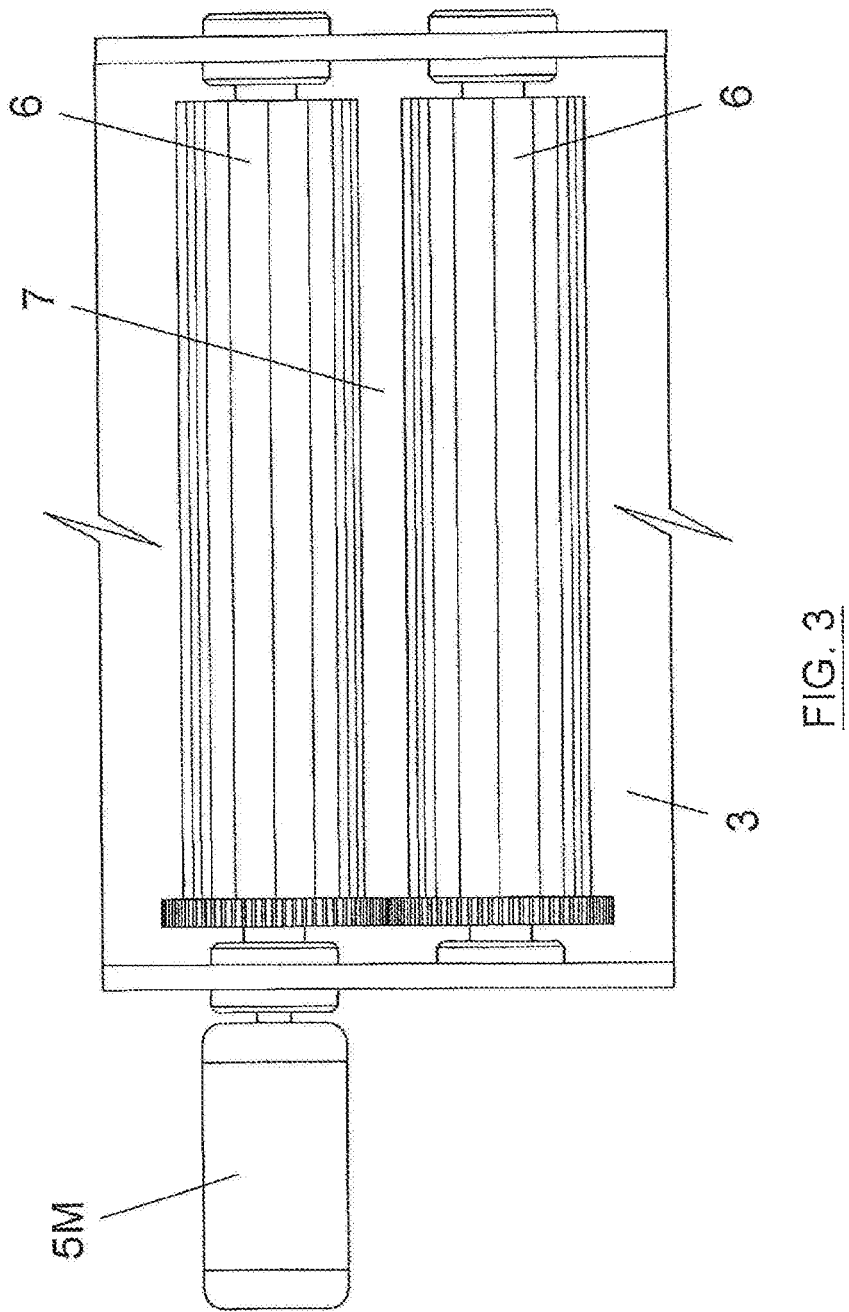
FIG. 3 is a top view of a preferred embodiment of the applicator shown over and a segment of a fitter belt.
Figure 4:
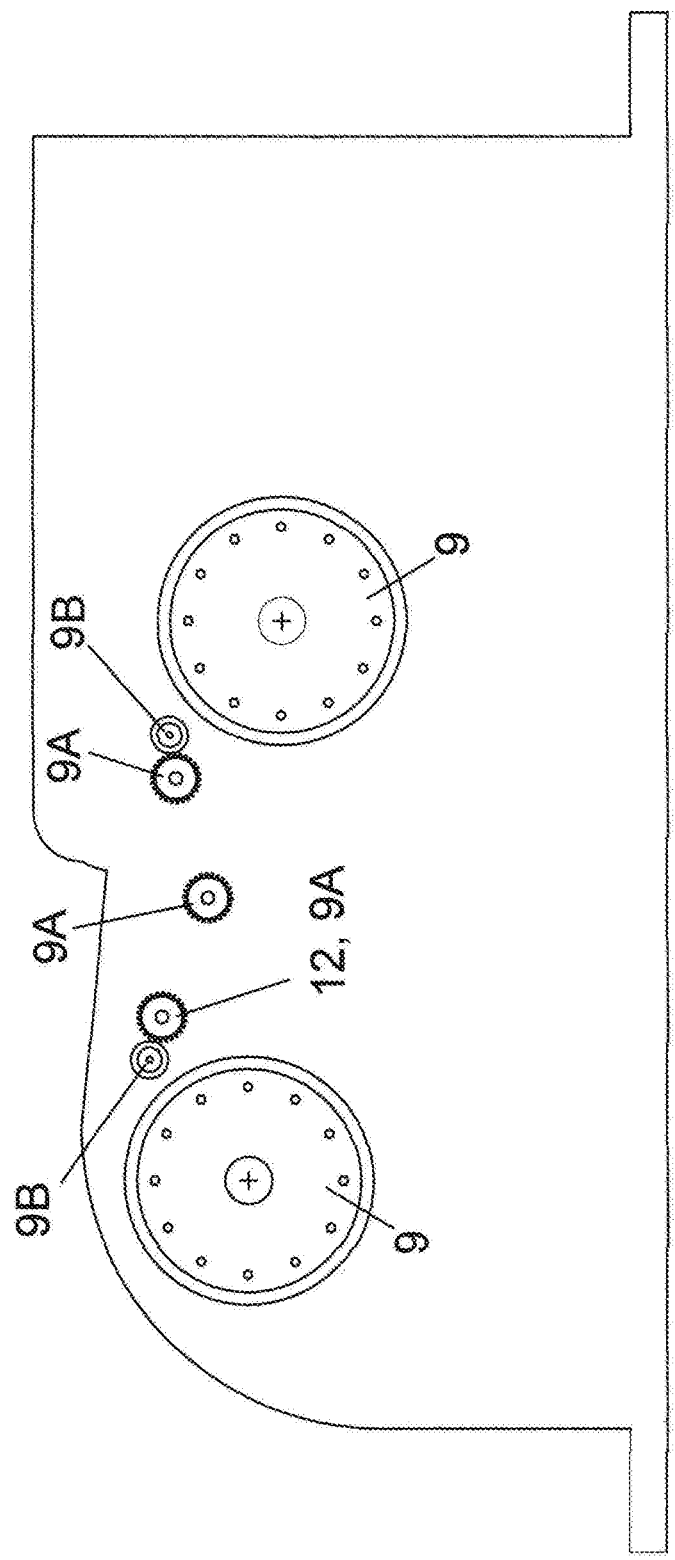
FIG. 4 is a side view of a preferred embodiment of the roller assembly on which the drive belt and the filter belts turn.
Figure 5:
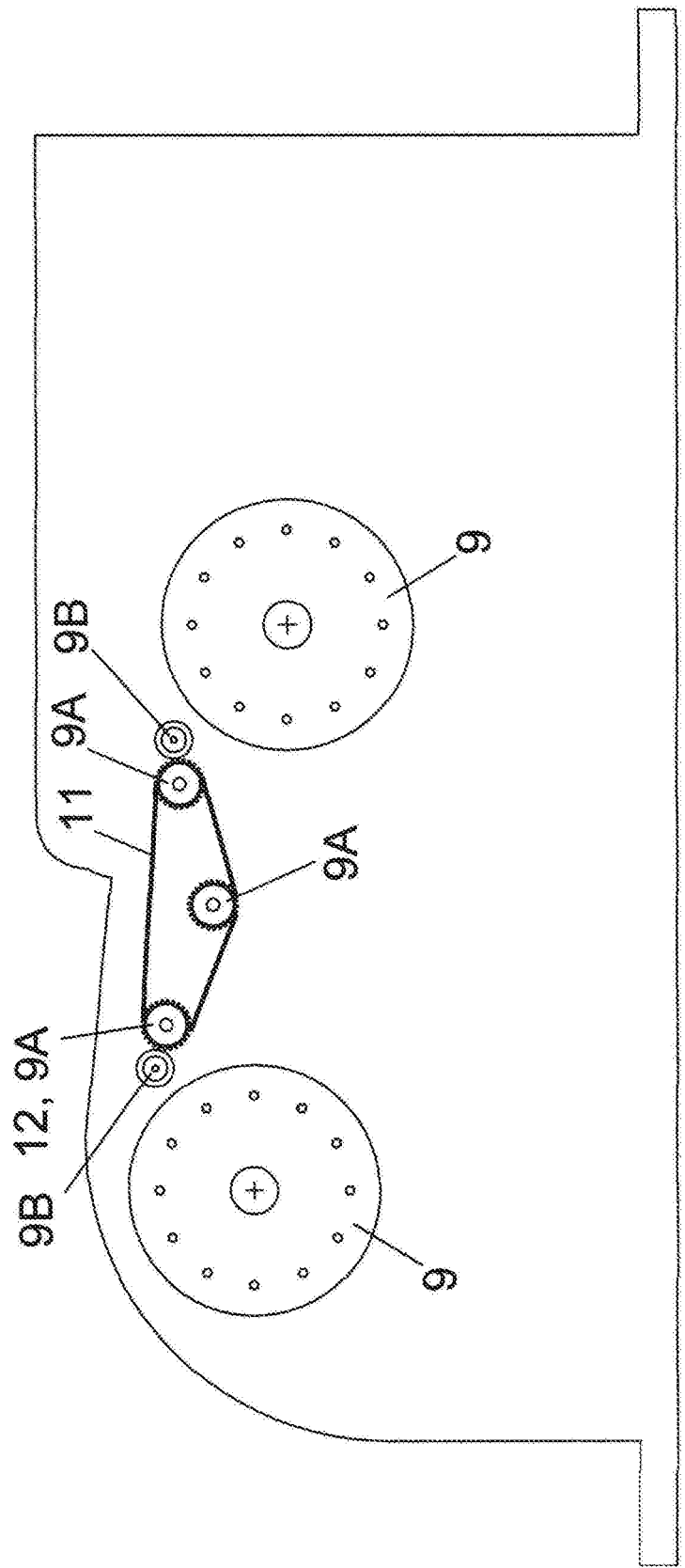
FIG. 5 is the view of FIG. 4 with the drive belt in place.
Figure 6:
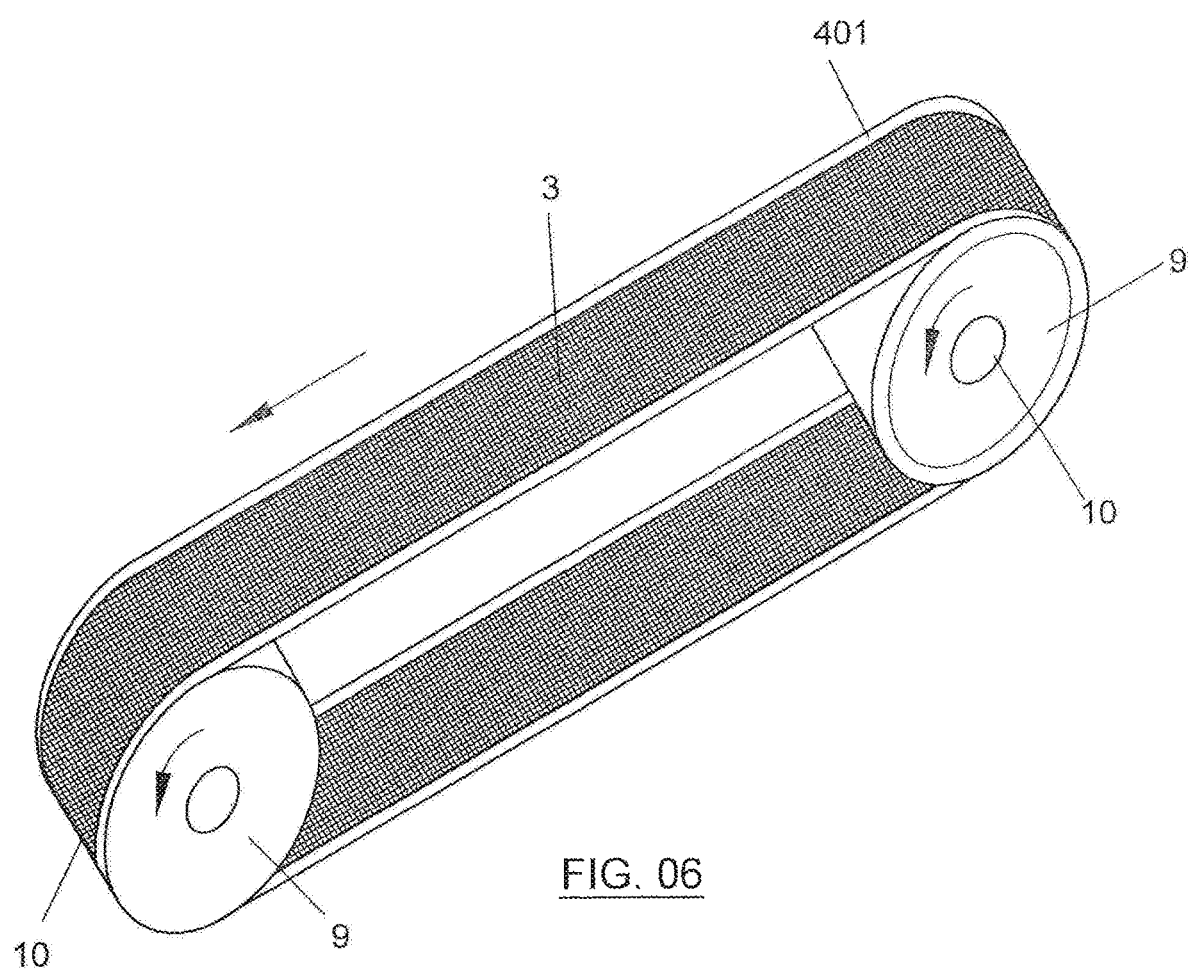
FIG. 6 is a perspective view of a preferred embodiment of the filter belt in place on the rollers.
Figure 7:
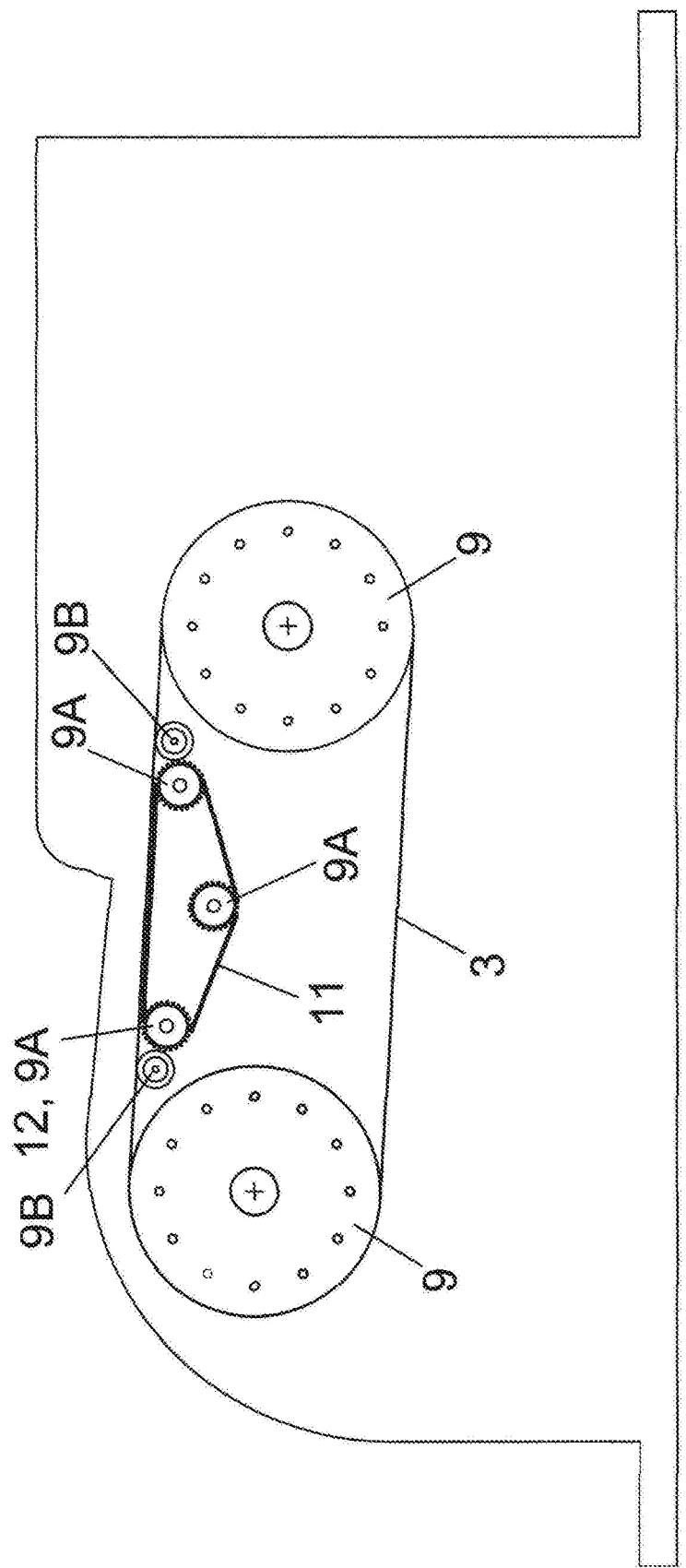
FIG. 7 is the view of FIG. 4 with the drive and filter belts in place.
Figure 8B:
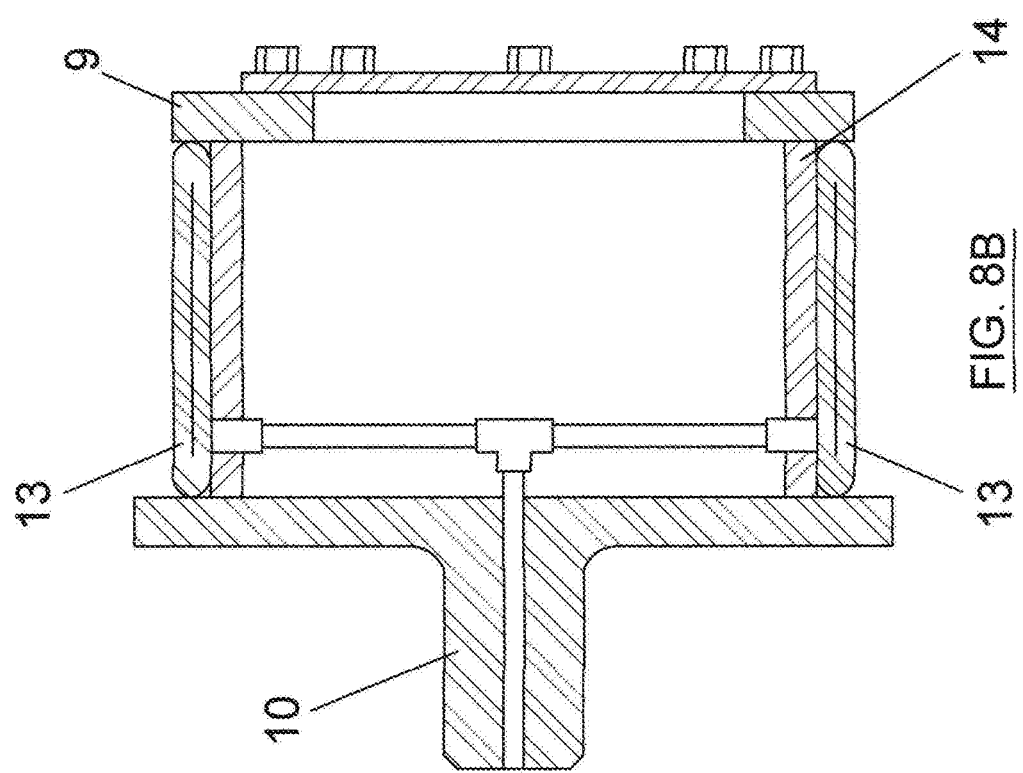
FIG. 8B is a side cut-away view of a preferred embodiment of a roller with a bladder shown in a deflated position.
Figure 10:
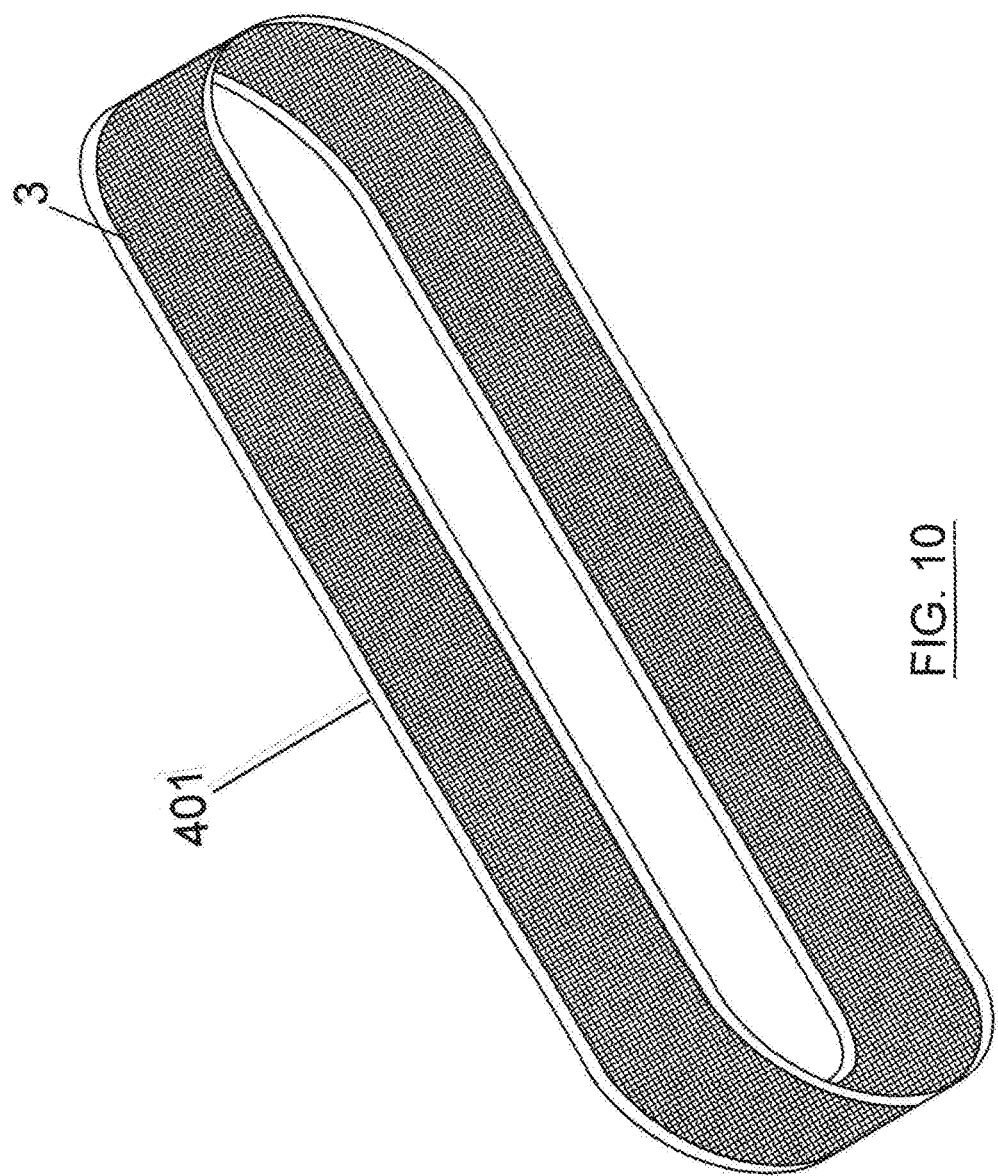
FIG. 10 is a perspective view of a preferred embodiment of a seamless filter belt.
Figure 12:
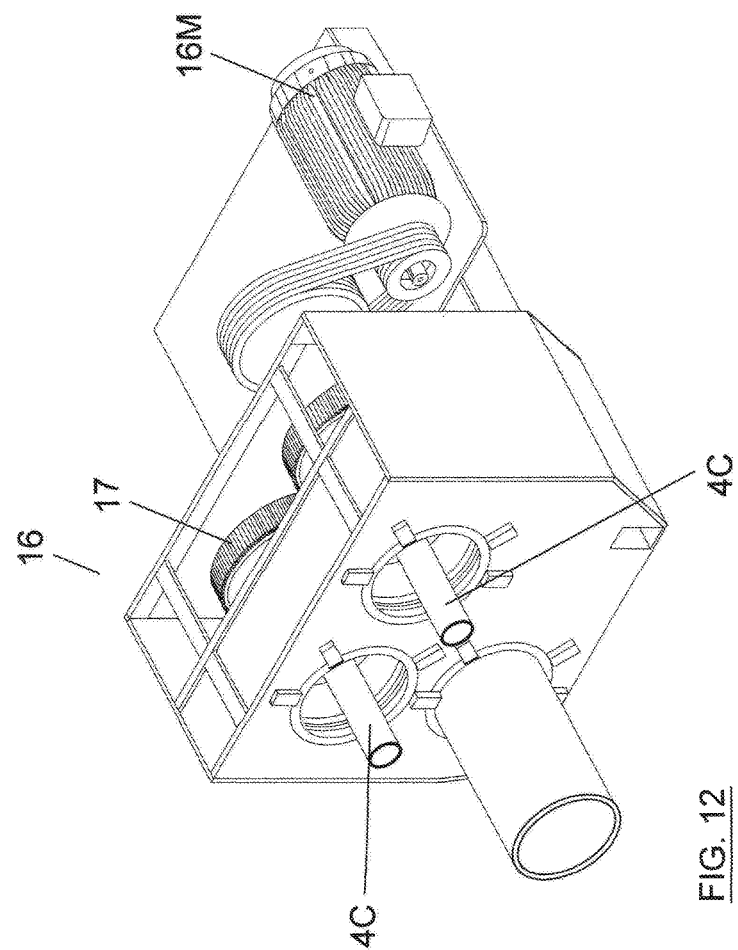
FIG. 12 is a perspective view of a preferred embodiment of a pelletizer.
Figure 13:
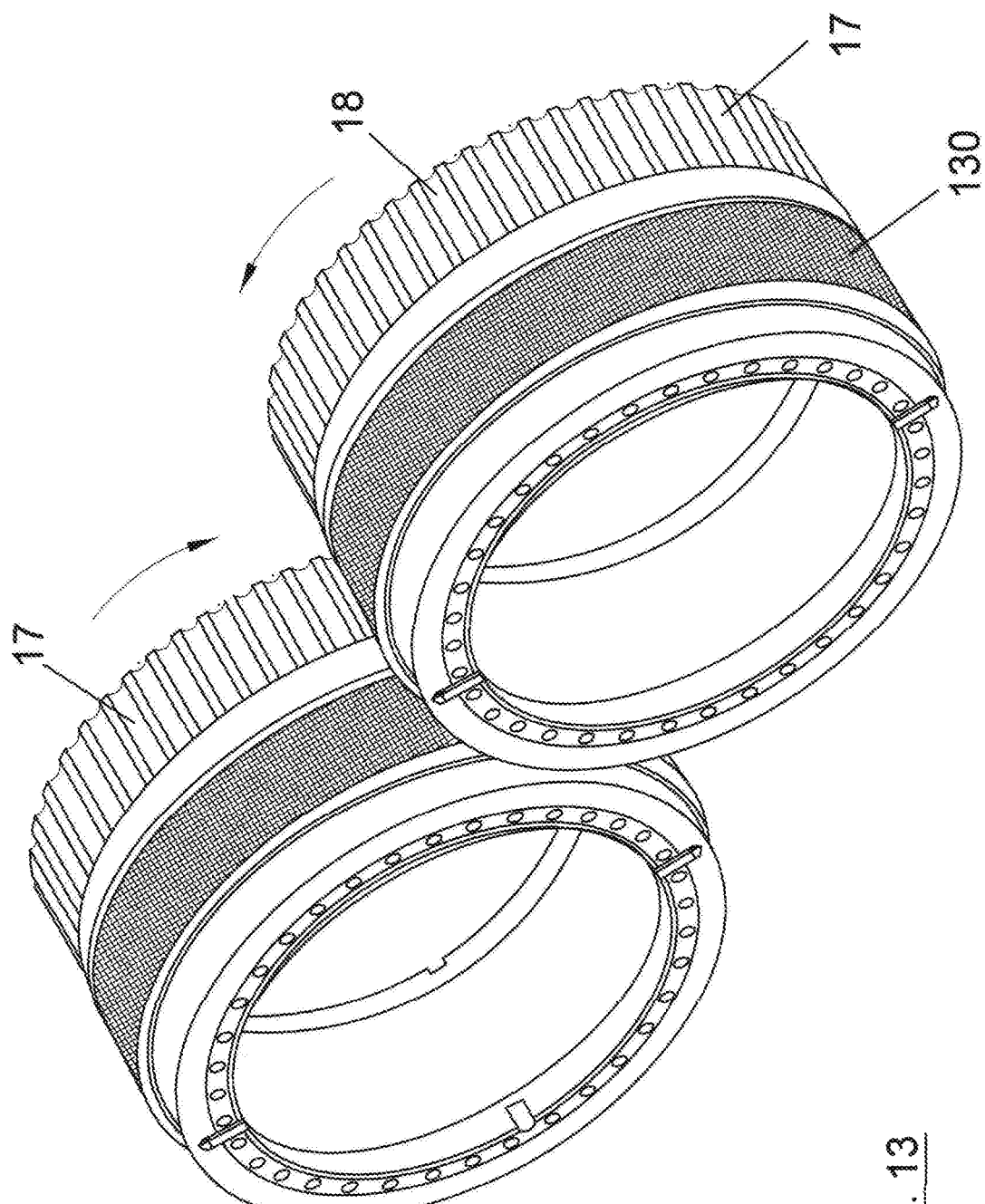
FIG. 13 is a perspective view of a preferred embodiment of a mated pair of pelletizer wheels.
Figure 14:
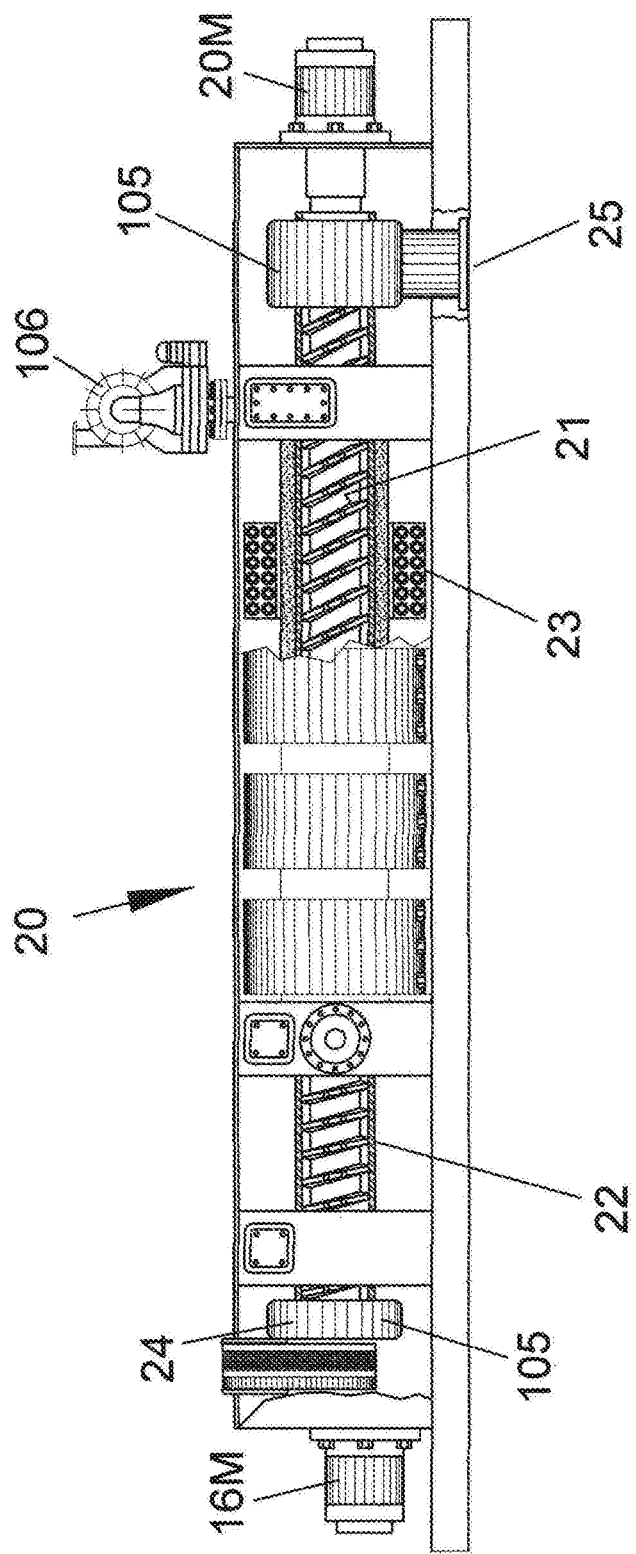
FIG. 14 is a side, partial cut-away view of a preferred embodiment of an induction furnace.
Figure 16:
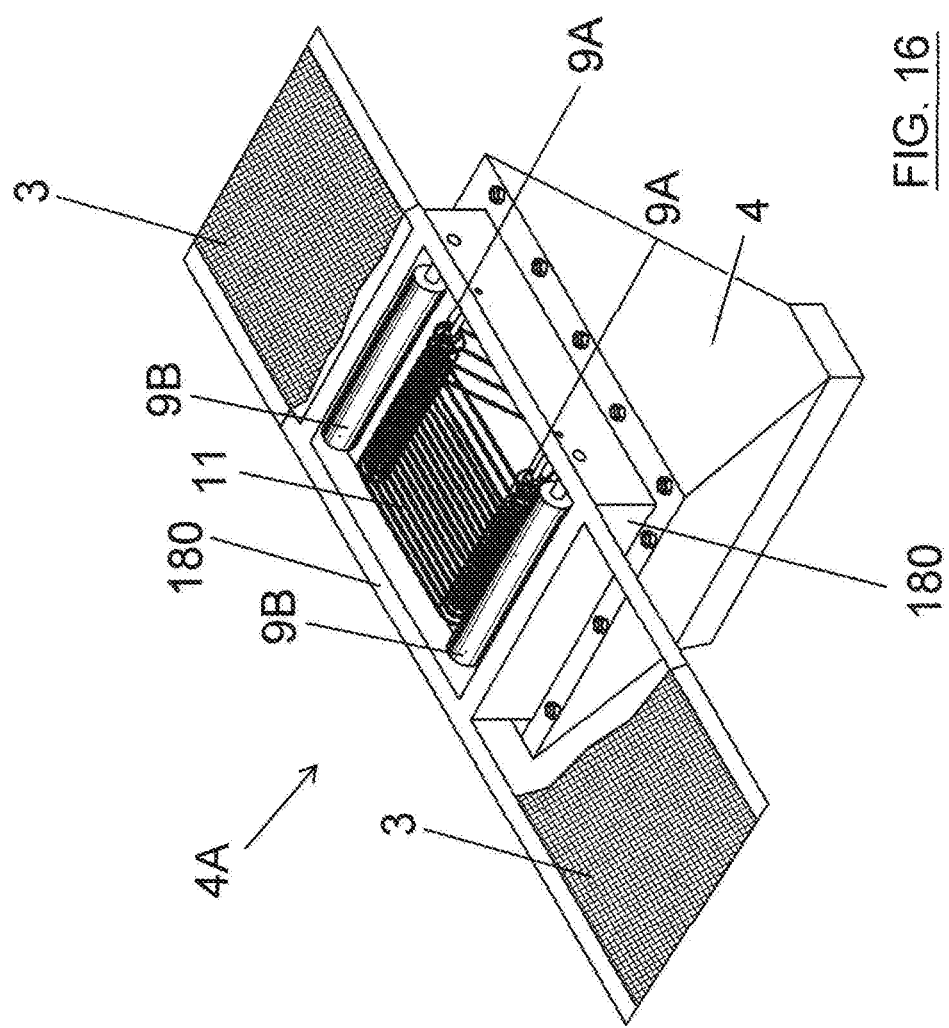
FIG. 16 is a perspective view of a preferred embodiment of a vacuum table.
Figure 18:
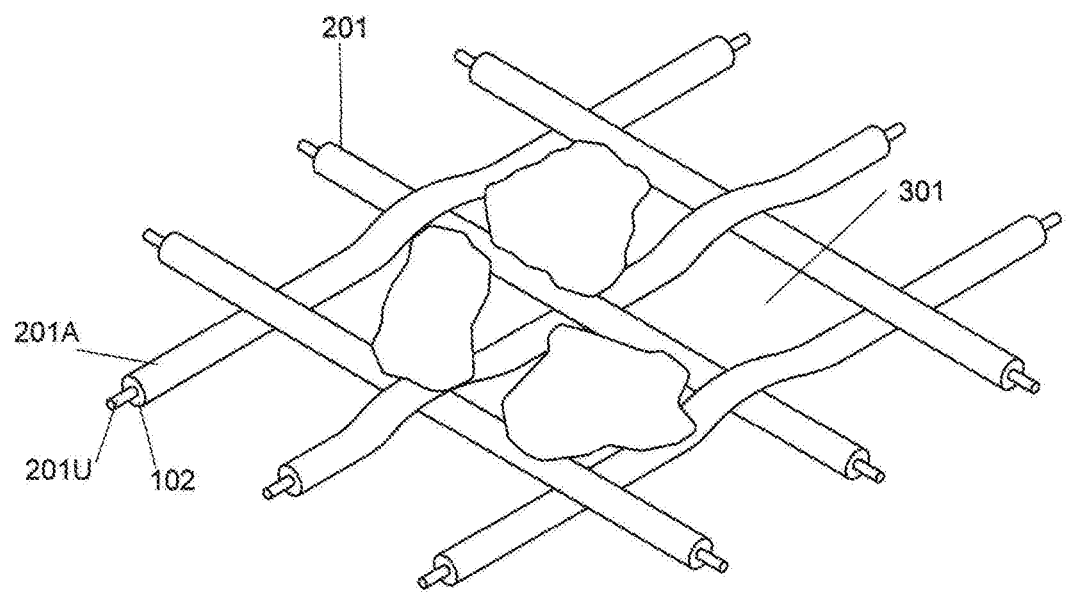
FIG. 18 is a close-up, perspective view of woven coated fibers, with the coating thickness shown enlarged for illustrative purposes, with cuttings in place in the filter openings.
Figure 19:
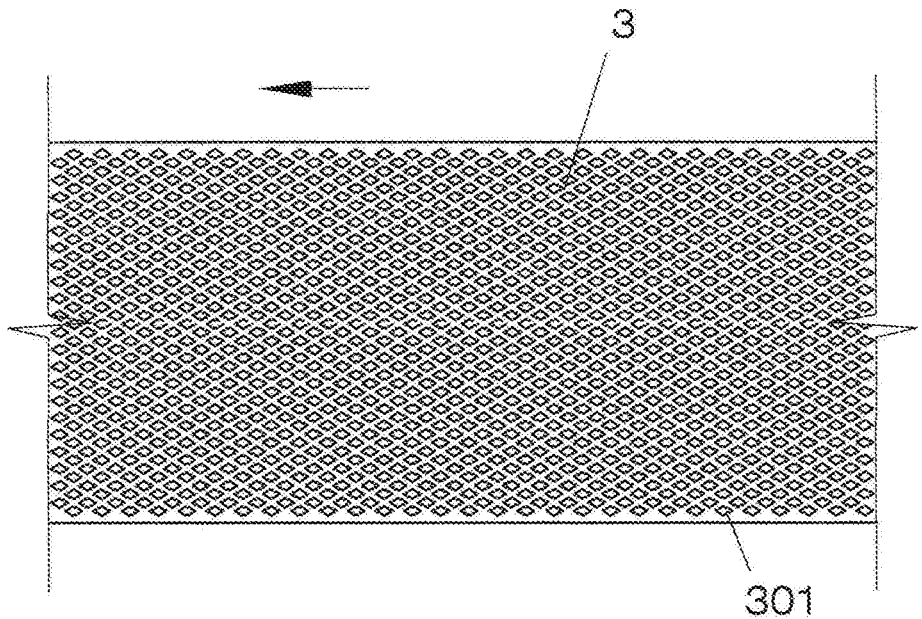
FIG. 19 is a top view of a preferred embodiment of a metal sheet fitter belt, where the arrows indicate the direction of travel of the belt in operation.
Figure 19A:
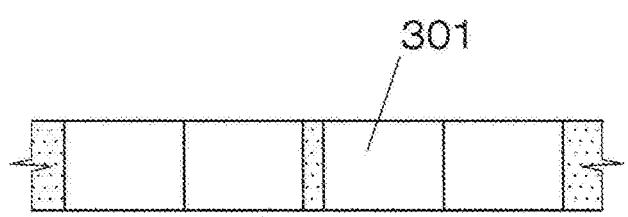
FIG. 19A is a cross sectional view of a preferred embodiment of the metal sheet filter belt illustrating the cross sections of the filter openings
Figure 19B:
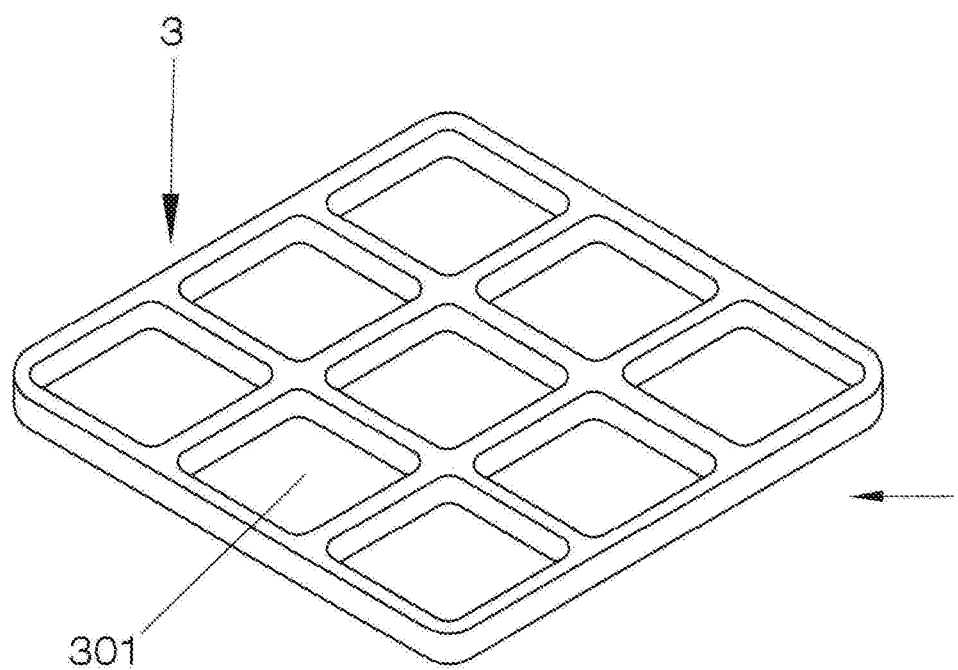
FIG. 19B is a perspective, close-up view of a metal sheet filter belt illustrating the shape of the filter openings.
Figure 20:
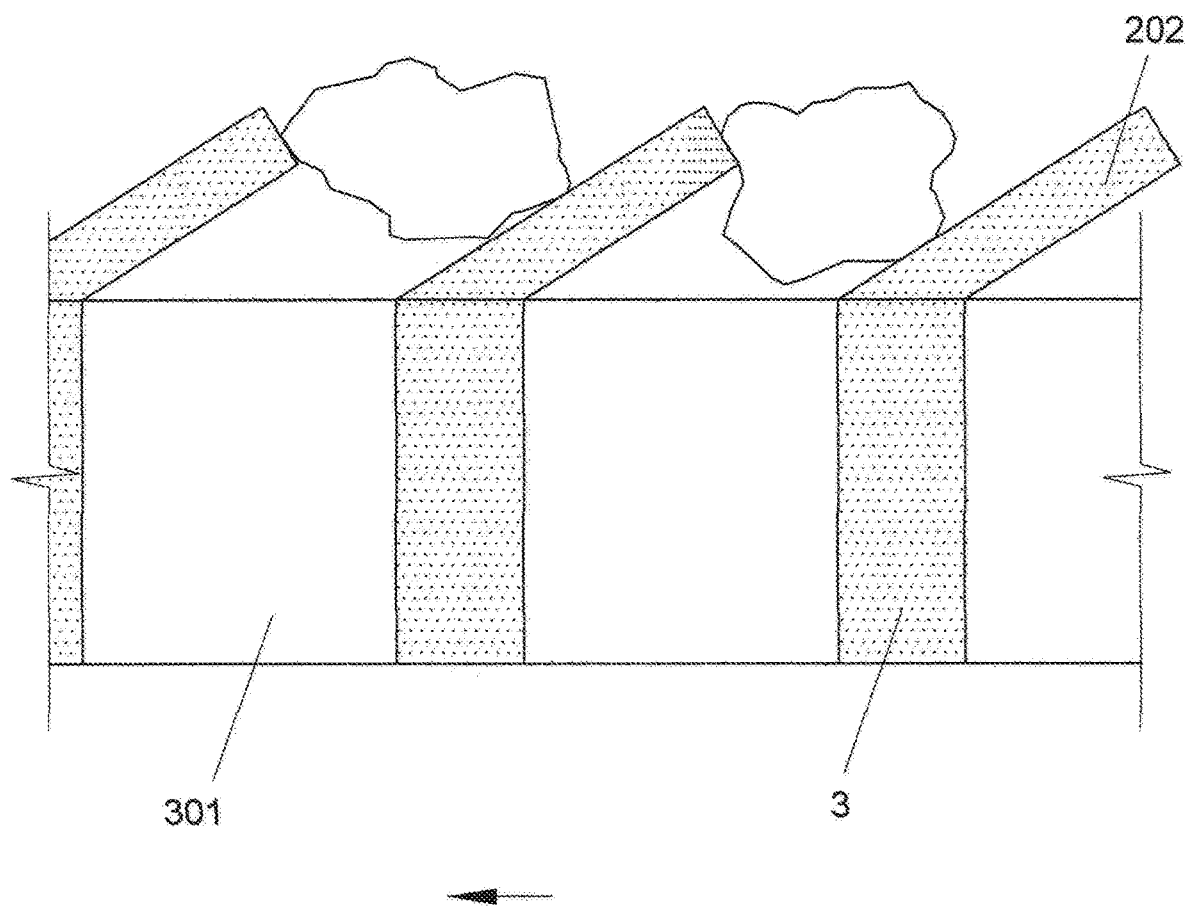
FIG. 20 is a cut-away close up of a metal sheet filter belt with turbulence tabs, where the arrows indicate the direction of travel of the belt in operation.
Figure 21:
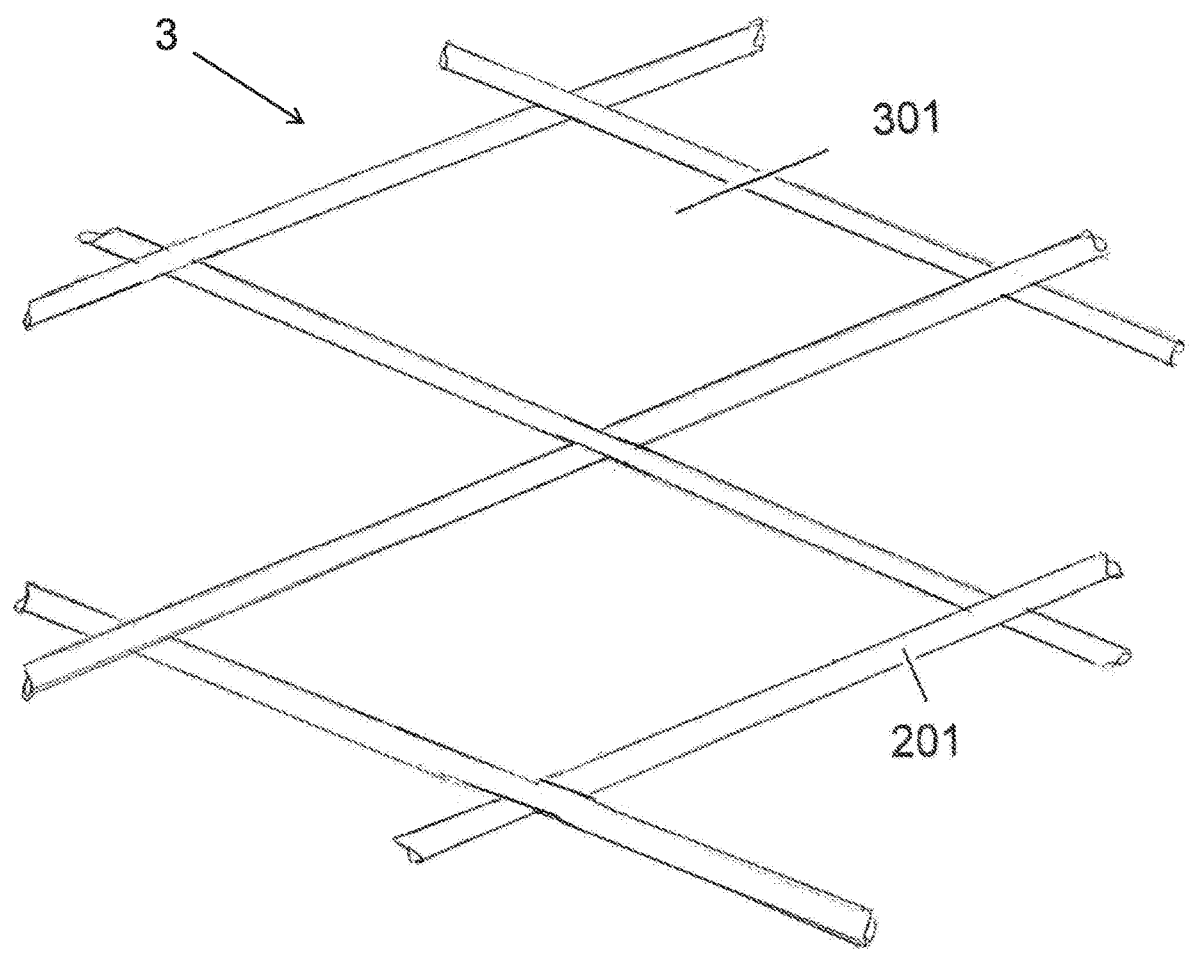
FIG. 21 is a perspective, close-up view of a preferred embodiment of a filter belt illustrating a plain Dutch weave.

A system of separating cuttings from drilling mud and treating the cuttings is disclosed. Drilling mud exits the well-bore laden with cuttings generated during the drilling process. The mixed cuttings and drilling mud will be a slurry. As discussed above, the cuttings must be removed from the drilling mud before the mud can be reused. The mud and cuttings slurry flows into a tank 1, known in the industry as a possum belly. Tank 1 is preferably a deep bellied tank which holds the drilling mud when it exits the well-bore. As tank 1 fills, it serves as a source of the slurry, though an inflow line may be the slurry source if tank 1 is omitted. The drilling mud and cuttings slurry will overflow into a liquid solid vacuum separator 2. In the preferred embodiment, a magnetic filter 101, preferably a strong corrosion resistant electromagnet, is positioned between separator 2 and tank 1 to remove metallic debris in the drilling mud.

Vacuum based liquid solid separators well known in the art. Examples include U.S. Pat. No. 4,750,920, which is hereby incorporated by reference. Generally, they include a continuous, porous, endless filter belt 3 (i.e., a loop) which runs conveyor-like over a vacuum source 4. The mud and cuttings slurry is deposited onto filter belt 3 which putts the slurry over vacuum 4. Vacuum 4 pulls the fluid off the cuttings and belt 3 carries the cuttings on for further treatment.

One problem with prior art separators 2 is that the slurry is not evenly distributed on filter belt 3. This results in uneven piles of cuttings on filter 3. As these piles of cuttings pass over vacuum 4, the cuttings at the bottom of each mound will partially shield the cuttings at the top from vacuum 4. Fluid pulled from the cuttings on the top of the mounds will also re-wet the cuttings on the bottom.

The uneven distribution of the slurry also results in open spots on filter belt 3. When open spots pass over vacuum source 4, more of the air will pass through the openings rather than through the piles of cuttings, reducing the effectiveness of vacuum 4.

The inventor addresses the foregoing issues with an applicator 5. Applicator 5 applies an even layer of slurry to filter belt 3. The deposited layer will preferably be one to two layers of cuttings thick. It will also preferably extend evenly across all of belt 3, so that the entire surface of belt 3 is coated, minimizing—and preferably eliminating—any open spaces on belt 3. When the evenly spread slurry of mud and cuttings pass over vacuum 4, the effectiveness of vacuum 4 will be enhanced significantly. More of the mud will be pulled off by vacuum 4 and less will be left on the cuttings.

In the preferred embodiment, applicator 5 comprises two elongated cylinders 6. Cylinders 6 are preferably made of Inconel or other similar hard, durable material. Cylinders 6 are positioned proximate to filter belt 3, preferably an adjustable 2 to 4 inches above belt 3. Cylinders 6 are preferably about 8 inches in diameter and extend the full width of the belt (as used herein, unless otherwise indicated, "about" means plus or minus 10 percent). Cylinders 6 are configured to rotate in opposite directions, so that they rotate toward each other when viewed from above—that is, above cylinders 6 and belt 3 relative to gravity. Cylinders 6 preferably have a gap 7 between them. Gap 7 is preferably an adjustable ¼ to ¾ inches wide, and will preferably not exceed about 1 inch. Cylinders 6 are preferably powered to rotate at an adjustable 25 to 50 rotations per minute (rpm's). One or more motors 5M may be provided to power cylinders 6.

Cylinders 6 are positioned in a discharge aperture 8 though which the mud/cuttings slurry must pass to reach filter belt 3. The direction of rotation of cylinders 6 prevents the slurry from passing through discharge aperture 8 without passing between the cylinders 6.

The rate of discharge from applicator 5 will depend upon the rate of rotation of cylinders 6, the size of gap 7, the viscosity of the slurry, and the size and number of cuttings in the slurry. However, by varying the rate of rotation of cylinders 6 and the width of gap 7 between cylinders 6 and synchronizing those conditions with the rate of travel of filter belt 3, a uniform layer of slurry may be deposited across filter belt 3. The piles of cuttings common in the prior art are eliminated as are the unfilled spaces on filter belt 3. When the slurry reaches vacuum 4, the individual cuttings are subjected to a uniform vacuum force. Because the cuttings will be deposited in a layer one to two cuttings thick, the cuttings will not be shielded from vacuum 4 by other cuttings. Similarly, drilling mud pulled from one cutting will be pulled through filter 3, rather than onto other cuttings. Likewise, because applicator 5 will uniformly cover filter 3 with slurry, there will be few and preferably no open spaces on filter belt 3, which will maximize the effect of vacuum 4 on the slurry. Once the vacuum is applied, most of the fluid will be removed from the cuttings in a fraction of a second.

As noted above, there are a variety of factors that will determine the rate of rotation of cylinders 6. However, for a slurry comprising about 30 percent cuttings by weight, with each cutting having an average circumference of about 0.39 to 0.45 inches, and with filter belt 3 traveling at a rate of about 4 feet per second, and with applicator cylinders 6 positioned about ¾ inches apart, a rate of rotation of about 50 rpm's for each 8 inch diameter cylinder 6 is expected to yield acceptable results.

Filter belt 3 will convey the evenly applied slurry over a vacuum table 4A. Vacuum tables come in many forms. They are commonly panels with multiple holes to allow a vacuum to be applied to the surface. In the preferred embodiment, the inventor contemplates using a frame 180 of non-porous material having a low coefficient of friction to form vacuum table 4A. Frame 180 is positioned below filter belt 3, relative to gravity and applicator 5. Highly porous drive belt 11 (discussed below) is positioned within frame 180 and below filter belt 3. Drive belt 11 serves the role of the perforated panel in the prior art. A pair of sealing rollers 9B is preferably contained within frame 180. Sealing rollers 9B are positioned to transition belt 3 onto drive belt 11 and to transition belt 3 away from drive belt 11. Together, frame 180, drive belt 11, and sealing rollers 9B form the preferred vacuum table 4A. Applicator 5 is positioned to apply the mud and cuttings slurry to filter belt 3 within vacuum table 4A or just before vacuum table 4A, relative to the direction of motion of filter belt 3.

Vacuum 4 will be applied to filter 3 and the slurry at table 4A. Vacuum 4 will draw the drilling fluid out of the slurry, and through filter 3, leaving the cuttings on filter 3. The cuttings, while not completely fluid free, will contain much less residual fluid than would be the case if the slurry were applied to filter belt 3 in a non-uniform fashion. Suitable sources of vacuum 4 are known in the art.

Belt 3 will convey the cuttings off vacuum separator 2 for further treatment. In the preferred embodiment, belt 3 is seamless. The ends of prior art endless belts are commonly connected in a releasable fashion, such as with hook and loop (Velcro) fasteners. Industrial zippers are used as well. Such prior art mechanisms facilitate the installation and removal of belts. However, prior art connection mechanisms create a dam, against which fluid will build up. Instead of being pulled through filter 3, some of the fluid that builds against the connection mechanism will be flung off belt 3 with each revolution of the connection mechanism. This results in the loss of valuable drilling fluid, runs the risk of discharging oils into the environment, and generally makes a mess. The use of a seamless belt 3 avoids this issue. There is no barrier to act as a dam. The fluid in the slurry remains evenly distributed across filter belt 3. More of the fluid gets pulled through filter 3 by vacuum 4, and little, if any, is discharged on each rotation.

In one preferred embodiment, seamless filter belt 3 is a woven belt made of fibers 201. By weaving belt 3 on a circular loom, similar to the way a sock is woven, belt 3 can be produced with no seam, or at least no transverse seam. Longitudinal seams 401 may be provided at the edges of belt 3. This will help prevent any unraveling of woven belt 3 and can also form a border to help prevent any of the slurry from running off the edge of belt 3. Longitudinal seams 401 are preferably made of carbon fiber.

During different stages in drilling, different configurations of belt 3 may be desired. Well-bores generally decrease in diameter the closer the bore gets to the bottom of the well. Thus, the used mud will typically have higher volumes of cuttings closer to the top of the well. The size of the cuttings will also tend to be smaller nearer the top, as strata near the surface tends to include more sands and clays while deeper strata tends to include more rock. In the early stages of drilling, the cuttings will often be smaller and a finer meshed filter belt 3 may be desirable.

As the well-bore gets deeper, the length of the column of drilling mud increases. This results in greater pressure being applied to the mud at the bottom of the well-bore. That increased pressure can force the drilling mud into the formation, resulting in potential loss of mud. It can also imperil the well-bore. One way drilling engineers address this issue is by weighting the mud, introducing additives to the mud to increase its density. A relatively light weighted mud will be about 9 pounds per gallon, while a heavy weighted mud may be as dense as 19 pounds per gallon.

One common weighting additive is barite (barium sulfate, $BaSO_4$). Barite can help seal pores in the formation, preventing the loss of mud. Barite is expensive, and it is desirable that any filter belt 3 leave the barite in the mud.

Drilling grade barite specifications typically allow no more than three percent of the barite particles to have a diameter greater than 74 microns. Thus, when barite is present in the mud, filter belt 3 should have openings large enough to pass 74 micron barite particles. This will result in most of the barite staying in the mud.

The introduction of barite to the drilling fluid makes it important to remove finer solids as soon as possible. As noted above, the presence of barite in the mud will make it difficult to remove particles finer than 74 microns without also removing the barite, and many fines are smaller than 74 microns. Because fines are most common in the upper portion of most wells and barite is often not needed until the lower portions are reached, screening for fines early in the drilling process is important to effectively remediate drilling mud. Once barite is added, other processing equipment— degassers, hydro-cyclone desilters, and centrifuges, to name a few—can be used to remove the fines. However, transfer of the mud to these devices requires pumping. Pumping the cuttings invariably leads to shearing, creating smaller cuttings and making them more difficult to remove. Thus, removal of fines before barite is added is highly desirable.

Although small fine producing portions of the formation are most common near the well surface, different drilling conditions may be encountered at different levels of the well. However, the changing conditions usually will not come as a surprise to the drilling engineer. Except in completely virgin formations, the general composition of the formation will be known by depth from prior well logs. This information will typically be available to the drilling engineer, so he will know what type of cuttings to expect in the mud at each stage. The ability to change belts 3 to match the anticipated cutting conditions is desirable.

An example filter plan is provided in FIG. 17 As illustrated, between the surface and about 1500 feet sand, clays, and soil are expected. A filter 3 having apertures of between about 30 and 41 microns (between about 595 and about 420 mesh) and preferably between about 34 and 41 microns (between about 500 and about 420 mesh) is appropriate. Between about 1500 feet and about 5000 feet sand, clays, and limestone are common. Here, a filter 3 having apertures between about 41 and 49 microns (between about 420 and about 297 mesh) is preferred. Between about 4000 and 12,000 feet, dolomite and sandstone will often be encountered in addition to sand, clays, and limestone. The well temperature will often start to rise. Downhole temperatures in the range of 165 to 200 degrees F. are not uncommon. Barite or other weighting additives are often added at these depths. When barite is used, filter 3 should have apertures of at least 74 microns (no more than about 200 mesh) here to keep the barite in the mud. Between 12,000 and 14,000 feet high strength limestone and granite are often encountered, in addition to dolomite. Temperatures commonly run between 300 and 525 degrees F. Barite or other weighting additives are usually present by this depth. Mud weights of 16 lbs per gallon are common. When barite is present, filter 3 should have apertures of at least 74 microns (no more than about 200 mesh). Between 14,000 and 20,000 feet, hard rock, chert, dolomite, and consolidated sands are frequently encountered. Temperatures between 300 and 525 degrees F. are common. Barite or other weighting material is usually being used at these depths. Mud weights of up to 19 lbs per gallon are common. When barite is present, filter 3 should have apertures of at least 74 microns (no more than about 200 mesh) to prevent filtering the barite from the mud.

Metal sheet belts 3 may be used at any depth. Woven belts 3 will be more appropriate at depths above about 12,000 feet as elevated temperatures will not be as common at these depths. Below about 12,000 feet a metal sheet belt 3 will be preferred.

In one preferred embodiment filter belt 3 is woven. The preferred weaving pattern is a plain Dutch weave. In a preferred embodiment belt 3 is made of fine, high strength fibers 201 such as Kevlar (poly-paraphenylene terephthalamide) or carbon fiber. Fibers 201 should have a very low absorption rate, low porosity, and a smooth external surface, preferably having a finish of about 2-5 microinches of maximum average roughness. The finished belt 3 will have a low coefficient of friction—preferably about 0.03—and will be between about 25 percent and about 37 percent open.

The degree of openness will effect how much fluid can pass through filter 3 per unit time. Conductance, a similar concept, is a measure of how much fluid can flow through filter 3 per unit area. This too will be effected by the degree of openness in filter 3. Openness wilt also effect how much fluid will be retained on the belt 3.

Degree of openness is a measure of the percentage of the filter 3 that is open space. It is the surface area of the filter 3 encompassed by the apertures 301. The surface area encompassed by the threads 201 is obviously not open. In a one square foot segment of filter 3, if 75 percent of the segment is occupied by the fibers 201, then the segment is 25 percent open.

In a woven filter 3, two factors directly effect degree of openness: fiber diameter and mesh count. Mesh count is the number of apertures per linear inch. Mesh count can be determined on the warp, the fibers running the length of the weave, and the shute, the fibers running across the weave. Mesh count is determined by starting the center of a fiber 201 and counting the number of apertures 301 crossed in one inch along the fiber 201. Warp mesh and shute mesh are not necessarily the same number, as the warp and shute fibers are not necessarily the same diameter nor are they necessarily spaced the same distance apart. However, the thinner fibers 201 are, the more apertures 301 there can be per linear inch and thus the greater the degree of openness in filter 3. Likewise, the greater the mesh count, the greater the degree of openness in the filter 3.

In addition to expediting the rate at which fluid flow through filter 3, maximizing openness will minimize the amount of fluid filter 3 can retain. Each fiber 201 can support some amount of drilling mud. All of the fluid will not be pulled through filter 3 by vacuum 4. Some fluid will remain on belt 3 as it rotates past vacuum table 4A. Retention of fluid on belt 3 is to be minimized Thinner fibers 201 help in that regard. The thinner fibers 201 are, the less fluid each can support. Thus, by minimizing the diameter of fibers 201, the degree of openness of filters 3 may be maximized and the amount of fluid filter 3 can retain will be minimized.

As an example, in a 48 inch wide belt that is about 36-37 percent open (0.0022 inch diameter fibers spaced about 0.0035 inches apart, 285 mesh count) and moving at about 120 inches per minute over a vacuum table 4A operating between about 21 and 26 inches of mercury and that is about 24 inches long and thus about 1152 inches square (24×48), filter belt 3 could process about 1200 gallons per minute of 15 pounds per gallon drilling mud. A more open belt 3 could process more drilling mud. However, the finer threads, while providing more openness and less surface area, also provide less strength, all else being equal.

Typically, fibers 201 will have a diameter of between about 0.006 inches and about 0.010 inches. Fibers 201 having a diameter of about 0.006 inches and spaced about 0.008 inches apart and with a mesh count of about 125 (about 120 microns) will create a filter 3 that is about 30-31 percent open. Fibers 201 having a diameter that is about 0.010 inches and spaced about 0.010 inches apart and with a mesh count of about 100 (about 149 microns) Till create a filter 3 that is about 22-23 percent open.

In another embodiment, fibers 201 will be about 0.0022 inches in diameter. By spacing these fibers about 0.035 inches apart and with a mesh count of about 285 (about 51 microns), a filter belt 3 that is about 36-37 percent open may be achieved.

A greater degree of openness may be achieved by using fibers with a smaller diameter and less openness may be achieved with fibers of greater diameter. Suitable woven belts 3 may be obtained from Textum, Inc. (DBA Tubular Fabrics) of Belmont, N.C.

Belt fibers 201 will preferably be coated. The coating 102 may facilitate the desired smoothness and the low absorption rate. Fibers 201 will preferably be resistant to acids, bases, H²S, brine, and other chemicals commonly encountered in used drilling fluids. Fibers 201 should also be resistant to UV degradation. Coating 102 may facilitate these resistances. However, any coating 102 will necessarily increase the fiber diameters. In the preferred embodiment, coating will have a thickness between about 0.0005 and 0.0007 inches. When, for example, coated fibers 201A have a total diameter (fiber plus coating) of about 0.0022 inches, the underlying fibers 201U will have a diameter of about 0.0015 inches.

One suitable coating 102 is Ultra High Molecular Weight Polyethylene (UHMWPE). Another is Teflon. In one embodiment coating 102 on fibers 201 is colored a hue different from that of the fibers 201U, preferably by dying coating 102. Alternatively, coating 102 could be provided in multiple layers, dyed different colors. This will provide a visual cue of coating wear. As coating 102 changes color, a visual cue will be provided to operators of the need to change filter 3.

Fibers 201 should preferably be non-magnetic. Metal shavings will be generated in the course of drilling. Metal debris should be captured by belt 3 and separated from the drilling mud. However, the metal debris should be removable from belt 3 in a cleaning step, discussed below. Ensuring that there is no magnetic attraction between fibers 201 and metal debris will facilitate removal of the debris from belt 3.

Fibers 201 should be stable at the temperatures at which drilling mud is commonly encountered. Fibers 201 should neither deteriorate, nor substantially expand or contract at these temperatures. Thermal expansion or contraction is to be avoided as it could lead to changes in the size of openings in filter 3.

Mud exiting medium depth wells (between about 5000 and about 12,000 feet) commonly have temperatures between 125 and 165 degrees F., and deeper wells can produce mud that is considerably hotter. Most fibers 201 discussed herein can withstand temperatures between 300 and 500 degrees F. without degradation. Fiberglass—a material commonly used in prior art filters—can deform at temperatures as low as 150 to 200 degrees F.

Woven metal fibers can withstand much higher temperatures without degradation. Most steel alloys can operate at about 300 degrees F., and as high as 700 degrees for brief periods of time, without substantial degradation. Nitinol can operate at about 1000 to 1500 degrees, and as high as about 2500 degrees for brief periods, without substantial degradation. Stainless steel fibers can operate at about 2000 degrees F., and as high as about 2400 degrees F. for brief periods of time, without substantial degradation. Titanium fibers can operate at about 2000 degrees F., and as high as about 2700 degrees F. for brief periods of time, without substantial degradation.

Operators should select filter belts 3 formed of material suitable for the mud temperatures anticipated. Alternatively, the mud must be allowed to cool before being treated. Any approach that requires cooling will obviously slow the treatment process.

In one preferred embodiment, fibers 201 are selected from Kevlar and carbon fiber or combinations thereof. Another option for fibers 201 are metal wires such as nitinol or stainless steel, which may be drawn and/or braided. Metal wires may be combined or intermixed with fabric fibers, on the warp, the shute, or both, if desired. Fibers 201 may be coated. Suitable coating include UHMWPE and/or Kevlar.

In another preferred embodiment, filter belts 3 are metal sheets. Metal sheet belts 3 can be cast or extruded. However, they should preferably be seamless. When a sheet of metal is welded to itself to form belt 3, seamlessness can be achieved using electron beam welding and keeping weld widths below about 0.031 inches. Suitable welding methods include electron beam welding, laser beam welding, and plasma beam arc welding.

In the preferred embodiment, metal sheet filter belts 3 are preferably made of stainless steel, Monel (a highly corrosion resistant nickel copper alloy, the preferred version having about 63.5 percent Ni and about 31.5 percent Cu); composite materials such as stainless steel and sintered metal: or nitinol, a roughly 50/50 alloy of nickel and titanium. Use of Monel belts can be particularly advantageous when the formation has imparted hydrogen sulfide gas to the drilling mud. Nitinol can be especially useful when high tension (150,000+ psi) applications are needed. Metal sheet belts 3 will preferably be between about 0.30 and 0.125 inches thick, most preferably between about 0.080 and 0.125 inches thick, and should be very smooth—about 10 micro inches maximum average roughness. The temperature ranges provided above for metal fibers 201 apply equally to metal sheet belts 3. Where Monel used, operational temperatures of up to about 1100 degrees F., and as high as 1750 degrees F. for brief periods, can be experienced without substantial degradation.

Any filter belt 3 must be porous. When metal sheet belts 3 are used, lasers may be used to create precision opening patterns in the belts. In one preferred embodiment, a pattern of diamond shaped openings 301 is provided. Diamond shape, meaning herein a quadrilateral, and preferably a parallelogram, having diagonals of different lengths. Primary examples include a non-square rhombus and a rhomboid. Diamond shape openings 301 offer an advantage in that when cuttings lodge in an opening 301, they are unlikely to completely plug the opening 301 to air flow. Irregularly shaped cuttings are unlikely to match a diamond shaped opening exactly. The differences in the length of the diagonals decreases the chances of an exact match between the cutting and opening 301. The resulting differences in shape between the cuttings and the opening 301 are likely to leave some room for air passage in the opening 301, even when a cutting is lodged in opening 301. Opening sizes will differ depending upon application.

One advantage of metal belts 3, whether sheet or fiber, is their ability to be charged. Many companies are developing custom weighting additives. The additives under development known to the inventor are high density spheres, typically made of carborundum (SiC). In addition to weighting the mud, these spheres are expected to serve as bearings, supporting the drilling string and reducing the amount of torque necessary to rotate the string.

An important design aspect of custom additives is that they be coated with that is either charged or chargeable. A metal belt 3 offers the possibility of capturing charged additives. By providing an electrical charge to the belt 3 that is opposite that of the additive, the additives will adhere to the belt 3 as the mud passes through. Belt 3 could be charged simply by running an electrical current through belt 3 from a battery or generator or rig power, not shown. Once the cuttings have been discharged, the additives may be released and collected for reuse by neutralizing the charge on belt 3. Note that this approach is opposite that of the filter belt 3 and barite weighting additives. There, the goal is to ensure that the barite is not removed from the mud. With charged additives, the goal would be to remove and collect the additives from the mud and reuse them as desired.

The charged additives will lend themselves to a two stage separation process. They could be removed in an initial filtration step, not unlike the magnetic filter 101 for removing metallic debris from the mud stream discussed above. Passing the mud stream through a charged filter 501 with large openings would allow the charged additives to be collected by the charged filter 501. The mud could then be passed through a filter 3 with much smaller openings, as there would be no weighting additives to keep in the mud.

Metal sheet filter belts 3 may be provided with turbulence tabs 202. Turbulence tabs 202 will typically be utilized when the openings in belt 3 are formed with a punch. By utilizing a blade that severs less than all sides of opening 301, a tab 202 will be created from the material removed to form the opening 301. Tabs 202 preferably extend from belt 3 in a direction that will be away from vacuum table 4A in operation. Tabs 202 will also be angled away from the direction of travel of belt 3. When the mud slurry is applied to filter 3, turbulence tabs 202 will push cuttings away from belt 3, partially countering the effect of vacuum 4 on the cuttings. This will help keep openings 301 open and the mud flowing through filter belt 3. Use of turbulence tabs 202 will be particularly useful when the mud contains an especially large amount of solids, such as after a down hole blowout.

Multiple parallel belts 3 may be utilized if desired. Having multiple belts can be advantageous for continuity of operation purposes. When drilling mud is being processed for reuse, remediating the drill mud quickly can be advantageous. The quicker the mud can be readied for reuse, the less new mud must be made. However, vacuum separator 2 will need to be s hut down occasionally—for service, or cleaning, to change belt 3, etc. If separator 2 is provided with multiple parallel belts 3, one can be stopped and a second started while the first is serviced without losing any time separating solids from the mud. Also, thinner belts are generally easier to operate than wide belts. If it were necessary to maximize the amount of mud processed at any one time, multiple lines could be used simultaneously, which offers operational advantages over operating a single belt 3 that was twice as wide.

It will be appreciated that well diameters are larger closer to the surface. Pumping rates are correspondingly higher closer to the surface than at deeper depths Where the well diameter is smaller. Thus, where multiple belts 3 may facilitate processing the greater volume of mud typical close to the surface, a single belt 3 may be sufficient to handle the lower volumes needed at lower depths.

Another advantage of multiple belts 3 is the possibility of having belts 3 of different sized openings 301 simultaneously available. Instead of stopping to change belts 3 as the drill moves into an area where weighting additives are introduced to the mud, the mud may simply be redirected from a belt 3 with smaller openings 301 to one with openings 301 large enough to allow the mud and weighting additives to pass through belt 3 together. Thus, as the well progresses through different strata at different depths, the mud engineer may switch the mud from one belt 3 to another to utilize the appropriate filter characteristics.

Another option with multiple belts 3 would be to use one belt 3 to remove and segregate charged weighting additives and one or more additional belts 3 to remove the cuttings. The cuttings/mud slurry would first flow through a metal belt 3 with relatively large openings. The belt 3 would be charged to attract and capture the charged additives. The additive free slurry would then flow onto a second belt 3 where the cuttings would be removed via vacuum separation. The additives may then be reintroduced to the cuttings free mud as desired.

Using a seamless belt 3 poses installation issues. Belt filter 3 rides on a plurality of rollers 9. Rollers 9 should preferably have a diameter of at least about 60 inches. Larger rollers 9 will impart a larger bending radius to belt 3, which will reduce stress on belt 3. When metal sheet belts 3 are used, the large diameter rollers 9 will allow belt 3 to bend without exceeding the yield stress of the material.

In the prior art, rollers 9 are typically mounted on an axle 10 supported on each end. Installing seamless belt 3 over rollers 9 supported from both ends would require rollers 9 to be dismounted. Otherwise, the supports would prevent belt 3 from being installed. This is one reason most prior art belts 3 have a separable seam.

In the preferred embodiment, rollers 9 are mounted on an axle 10 supported from one end only. This allows seamless belts 3 to be installed on and removed from rollers 9 on their unsupported or free side. By orienting rollers 9 so that their free sides are all on the same side, belt 3 may be installed and removed without dismounting rollers 9.

Filter belt 3 may be driven by one or more powered drive wheels. However, in one preferred embodiment, vacuum separator 2 is provided with a drive belt 11. Drive belt 11 is preferably made of a high strength material with a relatively high co-efficient of friction, such as rubber. It should be highly porous—generally more than fifty percent open so that it will t impede vacuum 4 or the fluids flowing through filter belt 3. In a preferred embodiment, drive belt 11 is comprised of a plurality of links 120. Drive belt 11 is positioned within filter belt 3. Drive belt 11 should be positioned around a plurality of rollers 9A, including at least one powered drive wheel 12. Drive belt 11 is positioned to be in close contact with filter belt 3 within vacuum table 4A, where filter belt 3 supports the slurry. The rotation of drive belt 11 will effect rotation of filter belt 3, thereby lessening the strain on, and increasing the life of, filter belt 3.

It will be appreciated that to install and remove filter belt 3, tension must be removed from rollers 9 on which belt 3 travels. The inventor contemplates achieving this by fitting at least one of rollers 9 with an inflatable bladder 13. Bladder 13 fits around an underlying wheel 14, like a tire on a bicycle wheel, which in turn rotates on an axle 10. When bladder 13 is inflated, the path of filter belt 3 is longer than it is when bladder 13 is deflated. Bladder(s) 13 are sized such that filter belt 3 is loose enough to slide on and off rollers 9 when bladder(s) 13 are deflated and tight when bladder(s) 13 are inflated.

One or more of rollers 9 may be provided with a plurality of apertures 30. By applying a vacuum 4B to roller 9, any excess fluid contained in belt 3 may be extracted. See, FIG. 9.

Solids will tend to build up in belt 3. When belt 3 is a fabric, the inventor contemplates passing belt 3 though an ultra-sonic bath 102. This will allow belt 3 to be cleaned without removing it from separator 2. When belt 3 is a metal, briefly heating a localized portion of belt 3 will cause the openings to expand, causing debris entrained in belt 3 to be dislodged. Once cleaning is complete, a water mist will cause openings to contract to their original size.

Nitinol is particularly suited to the heat, expand, cool method of cleaning belt 3. Nitinol exhibits super-elasticity and shape memory. A material with shape memory will vigorously change shape when the transformation temperature is crossed. Nitinol fibers 201 could be twisted to shorten them. Then, by heating the fibers above their transition temperature, the nitinol would unwind and expand, opening the apertures and releasing cuttings contained therein. Upon application of the water mist, the nitinol fibers would fall below the transition temperature and revert to their twisted, form, restoring the smaller mesh openings.

A similar approach could be used for belts 3 made of nitinol sheets. The sheets will be longer and/or wider above the transformation temperature. When heated above the transformation temperature, the belts will lengthen and/or widen, resulting in a change in the size of openings 301. Application of the water mist will both dislodge any debris not freed by the enlargement of the belt 3 and cause the belt 3 to contract back to its sub-transformation temperature size. Generally only a portion of belt 3 will be above the transformation temperature, and then only for a very brief time.

After the slurry has passed over vacuum 4, the majority of the drilling mud and other fluids will have been removed and collected. These fluids will be transferred for further treatment and eventual reuse and/or disposal.

The cuttings will be carried by filter belt 3 to a discharge point 103. In one preferred embodiment, fitter belt 3 will discharge the cuttings into a hopper 15 lined with tow coefficient of friction material, such as ultra high molecular weight polyethylene. Hopper 15 will direct the cuttings into pelletizer 16.

Upon exiting vacuum separator 2, the cuttings will typically have some oils on and especially in them. Oil content will commonly be between 3 and 6 percent, by weight. The cuttings will also be irregular in shape. Pelletizer 16 will reduce the oil and water content and regularize the size of the cuttings.

Pelletizer 16 comprises a pair of wheels 17 each containing a plurality of cavities 18. Cavities 18 have dimensions that match the desired shape of the pellets. In the preferred embodiment the pellets will be generally cylindrical and about ¾ of an inch long and about ¼ of an inch in diameter. Each cavity 18 will be the same length and about ½ the thickness of the desired pellets. As wheels 17 turn into each other, loose cuttings are forced into cavities 18. Cuttings that are too large to fit in cavities 18 are compacted or sheared off Cuttings that are too small to fill a cavity 18 are compacted with other cuttings pieces. The pressure applied to the cuttings will squeeze oils and waters from the cuttings, in part by crushing the internal cavities contained within the cuttings and in part by applying pressure to the clays and other cutting components that can absorb liquids. In the preferred embodiment, a channel 140 extends from each cavity 18 into the interior of wheel 17. A vacuum 4C is applied to each channel 140. Fluid extracted from the cuttings as they are pelletized will be collected by vacuum 4C, via channels 140, and routed for reuse or disposal. Wheels 17 are preferably powered by one of more motors 16M. Wheels 17 may be provided with a seal 130 to force any fluids to pass between wheels 17.

When the pelletized cuttings exit pelletizer 16, they will be substantially uniform in size. Pellets will be the size of cavities 18 or smaller. Oil content will be 3 percent, by weight, or less.

Once the cuttings have been pelletized, the cuttings may be stored for later treatment, if desired. However, in a preferred embodiment, the pelletized cuttings are transferred into an induction furnace 20.

Induction furnace 20 comprises a scroll 21 that rotates to move the pellets through the furnace 20 and a housing 22 containing scroll 21. Both are contained within a series of electrical coils 23. Coils 23 induce a magnetic field in scroll 21 and, in some embodiments, housing 22. The direction of the current in coils 23 alternates rapidly. This causes the magnetic field in scroll 21 and/or housing 22 to change polarity as well. The constant inversion of the magnetic field induces magnetic hysteresis heating in scroll 21 and/or housing 22. The internal temperature of furnace 20 will reach about 1800 degrees F., sufficient to eliminate essentially all oils and waters from the cuttings.

In a preferred embodiment, housing 22 is ceramic or other non-magnetic material. This will prevent hysteresis from occurring in housing 22. Scroll 21 will still be heated, but housing 22 will not. Preventing housing 22 from being heated is an important safety feature.

Drilling and production operations have areas that are classified according to the risk of explosion. There areas adjacent to the borehole, the solids control systems, and mud tanks which vulnerable to gas build up. Thus, flashpoints are to be avoided. A heat source or spark can lead to ignition of such gas concentrations.

Heating the interior of furnace 20 without heating housing 22 combined with the application of a vacuum to furnace 20 reduces the risk that furnace 20 will constitute an exposed flashpoint. The induction furnace 20 will be safe for use in a Class 1 Division I zone. In practice the entire solids control system will typically be located in a Class 1, Division II zone. This will allow the furnace to be used in hazardous areas near the well center, diminishing or eliminating the need to pump drilling mud.

In a preferred embodiment, housing 22 rotates as well as scroll 21. Preferably, housing 22 will rotate in the opposite direction from scroll 21. This will help prevent the pelletized cuttings from clumping within furnace 20 or becoming lodged therein. It also facilitates the exposure of the cuttings to the heated surface of scroll 21. Rotation of scroll 21 and housing 22 is preferably powered by one or more furnace motors 20M.

In a preferred embodiment, a vacuum is applied to furnace 20. Furnace 20 will have an ingress point 24, where pelletized cuttings enter furnace 20, and an egress point 25 where treated cuttings exit. Ingress and egress points 24, 25 will preferably be separated by the majority of the length of furnace 20. Ingress point 24 and egress point 25 are preferably each star valves 105. Star valves 105 allow incremental amounts of pellets to be added to and extracted from furnace 20 at a regular rate. Star valves 105 can also be sealed to furnace 20, so that the vacuum may be maintained within furnace 20. Preferably, the vacuum in furnace 20 will operate at about 26 inches of mercury.

By applying a vacuum to furnace 20, the vaporization of liquids on the pelletized cuttings will be enhanced. Oils in the pelletized cuttings may be vaporized at a lower temperature due to the vacuum, which reduces energy requirements. Vaporizing the oils at a lower temperature also reduces the risk that the chemicals being vaporized will react with other material in the cuttings or furnace 20.

A wizzard 106 is preferably provided proximate egress point 25. As the oils and waters vaporize furnace 20, the resultant gases must be removed to maintain the desired vacuum. Wizzard 106 is placed in the vacuum stream to remove any small solid particles that become entrained in the vapor stream exiting furnace 20. After removal, the vapor stream is condensed for further treatment, recycling, or disposal.

Induction furnaces are known in the prior art. Examples include U.S. Pat. No. 8,220,178, which is hereby incorporated by reference. One problem that arises when using such prior art devices is movement of the cuttings through furnace 20. Scroll 21 is supposed to move the solids through furnace 20 in much the same way that an augur moves grain. If the solids have a substantial amount of fluid present, the material can behave more like a slurry, which will cause scroll 21 to act like a screw pump instead of an augur. This can create much higher pressures and generally lead to issues moving the material, damage to furnace 20, or both.

Pelletizing the cuttings addresses many of the issues associated with the use of scroll 21 to move material through furnace 20. The size and shape of the cuttings are regularized, and excess fluids are removed. This makes it much easier to move the pelletized cuttings through furnace 20.

Use of pellets also allows heating in furnace 20 to be more constant. The size and fluid content of the material being treated in furnace 20 will be relatively constant when the material entering furnace 20 has been pelletized. Thus, the heat needed to treat the pelletized cuttings will also be predictable and uniform. This can be contrasted with the prior art in which higher and r core variable fluid content in the cuttings entering a furnace would lead to variable energy demands.

During treatment, the pelletized cuttings will be heated to about 300 degrees F. under vacuum and will preferably be discharged at no less than about 260 degrees F.

Upon exiting furnace 20, the fully treated cuttings will have virtually no detectable liquids—neither oils nor waters. The final product will be an inert powder suitable for discharge at sea or on land without any further treatment.

A control panel 107 is preferably provided. From control panel 107, an operator can control all of the aspects of separator 2, pelletizer 16, and furnace 20. Rate of rotation of pelletizer wheels 6, size of gap 7, speed of filter belt 3, rate of rotation of pelletizer wheels 17, temperature of furnace 20, rate of rotation of scroll 21 and housing 22, and rate of operation of star valve 105 can all be trolled from control panel 107. Cameras 109 may be provided at various locations to allow operators to monitor process conditions. A cat walk 110 may be provided to give operators access to various components of the device.

These and other improvements to the remediation of drilling mud and deoiling/dewatering of drilling cuttings be apparent to those of skill in the art from the foregoing disclosure and drawings and are intended to be encompassed by the scope and spirit of the following claims.

I claim:

1. A drilling mud remediation device comprising:
    a source of a slurry, said slurry comprising a mixture of drilling mud and cuttings;
    a liquid solid separator comprising a filter belt configured to rotate in a path about a plurality of rollers, wherein said path contains a vacuum table and a vacuum source configured to apply a vacuum to said filter belt at said vacuum table;
    an applicator configured to apply a uniform layer of said slurry to said filter belt on said path on or before said vacuum table; whereby rotation of said filter belt across said vacuum table will subject said layer of slurry to said vacuum and pull said drilling mud from said slurry and through said filter belt;
    said belt further configured to deliver said cuttings and remaining drilling mud to a pelletizer, said pelletizer configured to compress said cuttings into substantially uniform pellets; and
    an induction furnace configured to receive said pelletized cuttings from said pelletizer, said induction furnace configured to eliminate substantially all fluids from said pelletized cuttings.

2. A drilling mud remediation device according to claim 1 wherein said applicator comprises a pair of rollers positioned between said slurry source and said filter belt, said pair of rollers having a gap between said rollers.

3. A drilling mud remediation device according to claim 2 wherein said rollers are positioned to prevent said slurry from reaching said filter belt without passing through said gap and wherein said gap is not more than about 1 inch wide.

4. A drilling mud remediation device according to claim 2 wherein said pair of rollers are configured to rotate toward each other and toward said filter belt.

5. A drilling mud remediation device according to claim 4 wherein said filter belt is seamless.

6. A drilling mud remediation device according to claim 5 wherein said filter belt is comprised of woven, non-absorbent fibers.

7. A drilling mud remediation device according to claim 6 wherein said filter belt is at least about thirty-seven percent open.

8. A drilling mud remediation device according to claim 5 wherein said filter belt is metal.

9. A drilling mud remediation device according to claim 7 wherein said vacuum table comprises a porous drive belt positioned between said filter belt and said vacuum source, wherein said drive belt is configured to support said filter belt.

10. A drilling mud remediation device according to claim 9 wherein said drive belt is positioned on a plurality of rollers, at least one of which is powered, whereby rotation of said at least one powered roller will cause said drive belt to move through a path.

11. A drilling mud remediation device according to claim 10 wherein said drive belt path and said filter belt path coincide within said vacuum table, wherein said drive belt is configured to engage said filter belt within said vacuum table, whereby movement of said drive belt through said drive belt path will drive said filter belt through said filter belt path.

12. A drilling mud remediation device according to claim 5 wherein said plurality of rollers are each configured to rotate on an axle and wherein said axles each have a supported side and a free side and wherein said free sides are all on the same ends of said rollers.

13. A drilling mud remediation device according to claim 12 wherein said rollers have an outside diameter and wherein at least one of said rollers has an inflatable and deflatable bladder whereby said outside diameter of said at least one roller my be changed by inflating and deflating said bladder.

14. A drilling mud remediation device according to claim 1 wherein at least one of said plurality of rollers has an external surface containing a plurality of apertures and a vacuum source in fluid communication with said plurality of apertures whereby excess fluid in said filter belt may be collected as said filter belt moves over said at least one of said plurality of rollers by applying said vacuum source to said apertures.

15. A drilling mud remediation device according to claim 1 wherein said pelletizer comprises a pair of mated wheels containing a plurality of cavities, said wheels configured to rotate against each other, said wheels sized and positioned to force cuttings passing through said pelletizer between said wheels when said wheels are rotated, whereby cuttings passing through said pelletizer will be forced into said cavities and conformed in shape and size to said cavities.

16. A drilling mud remediation device according to claim 15 wherein said wheels further comprise a plurality of channels extending from said cavities to the interior of said wheels and a vacuum source in fluid communication with said channels, whereby fluid forced from said cuttings during pelletization may be collected.

17. A drilling mud remediation device according to claim 1 wherein said induction furnace comprises a housing, a scroll, and a plurality of alternating electrical coils surrounding said housing and said scroll.

18. A drilling mud remediation device according to claim 17 wherein said housing and said scroll are configured to rotate.

19. A drilling mud remediation device according to claim 18 wherein said housing and scroll are configured to rotate in opposite directions.

20. A drilling mud remediation device according to claim 17 wherein said furnace is fluidly connected to a vacuum source.

21. A drilling mud remediation device according to claim 1 further comprising a magnetic filter positioned to filter said slurry before said slurry enters said applicator.

22. A drilling mud remediation device according to claim 1 further comprising an electrically charged filter positioned to filter charged particles from said slurry before said slurry enters said applicator.

23. A drilling mud remediation device comprising:
a source of a slurry, said slurry comprising a mixture of drilling mud and cuttings;
a liquid solid separator comprising a filter belt configured to rotate in a path about a plurality of rollers, wherein said path contains a vacuum table and a vacuum source configured to apply a vacuum to said filter belt at said vacuum table; and
an applicator comprising a pair of rollers positioned between said slurry source and said filter belt, said pair of rollers having a gap between said rollers, wherein said applicator is configured to apply a uniform layer of said slurry to said filter belt on said path on or before said vacuum table;
whereby rotation of said filter belt across said vacuum table will subject said layer of slurry to said vacuum and pull said drilling mud from said slurry and through said filter belt.

24. A drilling mud remediation device according to claim 23 wherein said rollers are positioned to prevent said slurry from reaching said filter belt without passing through said gap.

25. A drilling mud remediation device according to claim 24 wherein said gap is not more than about 1 inch wide.

26. A drilling mud remediation device according to claim 25 wherein said pair of rollers are configured to rotate toward each other and toward said filter belt.

27. A drilling mud remediation device according to claim 26 wherein said filter belt is seamless.

28. A drilling mud remediation device according to claim 27 wherein said filter belt is comprised of woven, non-absorbent fibers.

29. A drilling mud remediation device according to claim 28 wherein said woven, non-absorbent fibers are selected from kevlar, carbon fibers, metal wires, and combinations thereof.

30. A drilling mud remediation device according to claim 29 wherein said metal wires are selected from stainless steel and nitinol and combinations thereof.

31. A drilling mud remediation device according to claim 30 wherein said device is configured to selectively induce an electrical charge on said filter belt, whereby charged particles within the drilling mud may be electrically captured.

32. A drilling mud remediation device according to claim 28 wherein said belt is between 22 and about 37 percent open.

33. A drilling mud remediation device according to claim 32 wherein said fibers have an outside diameter of between about 0.006 and about 0.0022 inches.

34. A drilling remediation device according to claim 33 wherein said fibers have an outside diameter between about 0.006 and about 0.010 inches.

35. A drilling mud remediation device according to claim 28 wherein said woven, non-absorbent fibers are covered with a corrosion resistant coating.

36. A drilling mud remediation device according to claim 35 wherein said coating is resistant to UV degradation.

37. A drilling mud remediation device according to claim 35 wherein said coating is dyed a color different from the color of the fibers.

38. A drilling mud remediation device according to claim 37 wherein said coating is Ultra High Weight Polyethylene.

39. A drilling mud remediation device according to claim 38 wherein said coating has a finish of at least about 2 to 5 micro inches maximum average roughness.

40. A drilling mud remediation device according to claim 28 wherein said woven fibers have a weave pattern comprising a plurality of diamond shaped openings.

41. A drilling mud remediation device according to claim 27 wherein said filter belt is metal sheet.

42. A drilling mud remediation device according to claim 41 wherein said filter belt contains a plurality of diamond shaped openings.

43. A drilling mud remediation device according to claim 41 wherein said device is configured to selectively induce an electrical charge on said filter belt, whereby charged particles within the drilling mud may be electrically captured.

44. A drilling mud remediation device according to claim 23 wherein said vacuum table comprises a porous drive belt positioned between said filter belt and said vacuum source, wherein said drive belt is configured to support said filter belt.

45. A drilling mud remediation device according to claim 44 wherein said drive belt is positioned on a plurality of rollers, at least one of which is powered, whereby rotation of said at least one powered roller will cause said drive belt to move through a path.

46. A drilling mud remediation device according to claim 45 wherein said drive belt path and said filter belt path coincide within said vacuum table, wherein said drive belt is configured to engage said filter belt within said vacuum table, whereby movement of said drive belt through said drive belt path will drive said filter belt through said filter belt path.

47. A drilling mud remediation device according to claim 27 wherein said plurality of rollers are each configured to rotate on an axle and wherein said axles each have a supported side and a free side and where said free sides are all on the same ends of said rollers.

48. A drilling mud remediation device according to claim 47 wherein said rollers have an outside diameter and wherein at least one of said rollers has an inflatable and deflatable bladder whereby said outside diameter of said at least one roller my be changed by inflating and deflating said bladder.

49. A drilling mud remediation device according to claim 23 wherein at least one of said plurality of rollers has an external surface containing a plurality of apertures and a vacuum source in fluid communication with said plurality of apertures whereby excess fluid in said filter belt may be collected as said filter belt moves over said at least one of said plurality of rollers by applying said vacuum source to said apertures.

50. A drilling mud remediation device according to claim 23 further comprising an electrically charged filter positioned to filter charged particles from said slurry before said slurry enters said applicator.

51. A drilling mud remediation device according to claim 23 further comprising a magnetic filter positioned to filter said slurry before said slurry enters said applicator.

52. A device for treating drilling mud cuttings comprising
a pelletizer, said pelletizer configured to compress cuttings into substantially uniform pellets; and
an induction furnace configured to receive said pelletized cuttings from said pelletizer, said induction furnace configured to eliminate substantially all fluids from said pelletized cuttings.

53. A device for treating drilling mud cuttings according to claim 52 wherein said pelletizer comprises a pair of mated wheels containing a plurality of cavities, said wheels configured to rotate against each other, said wheels sized and positioned to force cuttings passing through said pelletizer between said wheels when said wheels are rotated, whereby cuttings passing through said pelletizer will be forced into said cavities and conformed in shape and size to said cavities.

54. A drilling mud remediation device according to claim 53 wherein said wheels further comprise a plurality of channels extending from said cavities to the interior of said wheels and a vacuum source in fluid communication with said channels, whereby fluid forced from said cuttings during pelletization may be collected.

55. A drilling mud remediation device according to claim 54 wherein said induction furnace comprises a housing, a scroll, and a plurality of alternating electrical coils surrounding said housing and said scroll.

56. A drilling mud remediation device according to claim 55 wherein said housing and said scroll are configured to rotate.

57. A drilling mud remediation device according to claim 56 wherein said housing and scroll are configured to rotate in opposite directions.

58. A drilling mud remediation device according to claim 57 wherein said furnace is fluidly connected to a vacuum source.

* * * * *